United States Patent [19]

Naito et al.

[11] Patent Number: 5,501,109
[45] Date of Patent: Mar. 26, 1996

[54] TORSION TORQUE DETECTING DEVICE, A SLIP DETECTING DEVICE, A ROAD FRICTION COEFFICIENT DETECTING DEVICE AND A TORSION TORQUE DETECTING METHOD

[75] Inventors: Yasuo Naito; Hideki Doi; Chialki Fujimoto, all of Himeji, Japan

[73] Assignee: Mitsubishi Denki Kabushiki Kaisha, Tokyo, Japan

[21] Appl. No.: 396,524

[22] Filed: Mar. 1, 1995

[30] Foreign Application Priority Data

Nov. 30, 1994 [JP] Japan .................................. 6-296694

[51] Int. Cl.$^6$ .................................................. G01B 3/02
[52] U.S. Cl. .................................. 73/862.191; 73/116
[58] Field of Search ................ 73/862.191, 862.28, 73/116, 117.2, 117.3, 862.12–862.16

[56] References Cited

U.S. PATENT DOCUMENTS 2,311,331  2/1943  Ericson ........................ 73/862.191
4,064,748  12/1977  Leshner et al. .............. 73/862.191 X
4,450,728  5/1984  D'Angelo et al. ........... 73/862.191 X
4,991,429  2/1991  Stacey et al. ..................... 73/116

FOREIGN PATENT DOCUMENTS 4-50972  8/1992  Japan .
4-62327  10/1992  Japan .

Primary Examiner—Richard Chilcot
Assistant Examiner—Elizabeth L. Dougherty
Attorney, Agent, or Firm—Sughrue, Mion, Zinn, Macpeak & Seas

[57] ABSTRACT

A torsion torque detecting device includes a power unit rotation velocity detector for detecting a rotation velocity of a power unit for driving a vehicle, a power unit rotation acceleration calculator for calculating a rotation acceleration of the power unit based on the rotation velocity of the power unit, a power unit output torque calculator for calculating an output torque of the power unit based on operational parameters of the power unit, and a torsion torque calculator for calculating torsion torques of wheel drive shafts for driving wheels based on the rotation acceleration of the power unit and the output torque of the power unit.

14 Claims, 14 Drawing Sheets

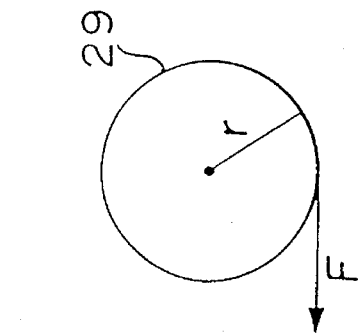
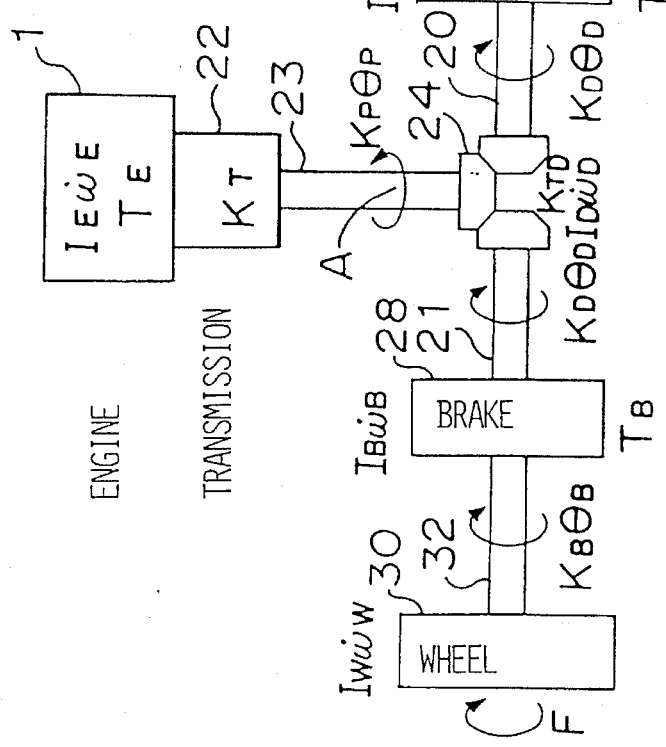
FIGURE 4(a)
FIGURE 4(b)

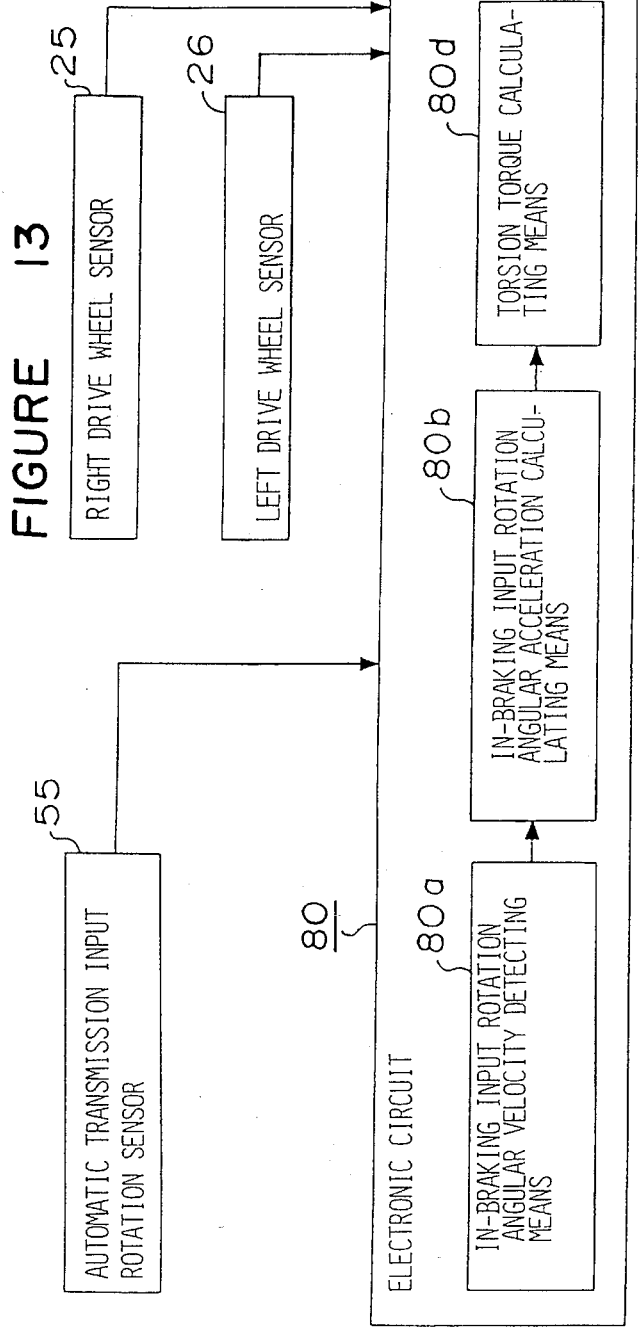
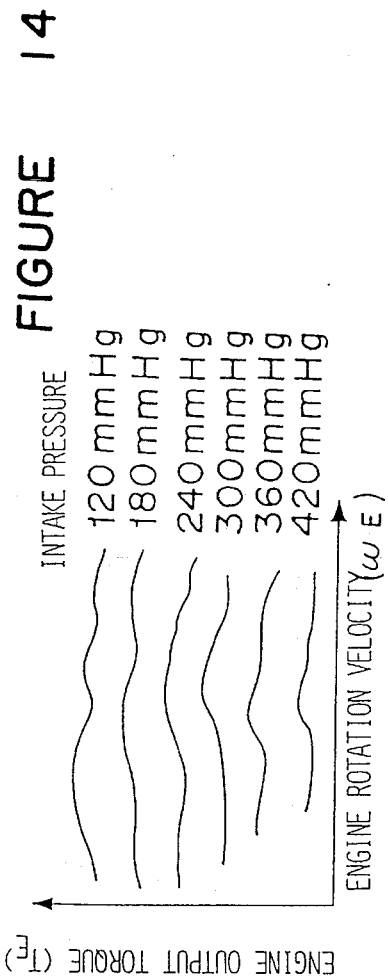

TORSION TORQUE DETECTING DEVICE, A SLIP DETECTING DEVICE, A ROAD FRICTION COEFFICIENT DETECTING DEVICE AND A TORSION TORQUE DETECTING METHOD

BACKGROUND OF THE INVENTION

1. Field of the Invention

This invention relates to a torsion torque detecting device for detecting torsion torques of wheel drive shafts of a vehicle, a slip detecting device, a road friction coefficient detecting device using the torsion torque detecting device, and a torsion torque detecting method.

2. Discussion of the Prior Art

There have been conventional devices of this kind disclosed, for instance, in Japanese Examined Patent Publications No. 50972/1992 and No. 62327/1992. These are a phase difference device which detects a torsion caused in a wheel drive shaft in transmitting a torque of an internal combustion engine which is a power unit for driving a vehicle, as a deviation of a torsion phase between two points of the wheel drive shaft, and a magnetostriction device for detecting a change in the magnetic property of the wheel drive shaft.

Further, there are a strain gage type device which electrically detects the torsion, wherein electric resistance value of a strain gage is changed by strain, and the like.

The magnetostriction type device detects a variation in torque as a change in magnetostriction of the wheel drive shaft, by a combination of an excitation coil and a detection coil which are provided in the vicinity of the wheel drive shaft.

The phase difference type device employs magnetostriction elements or optical reflecting elements installed at at least two portions of the wheel drive shaft and detects a rotation phase difference between different shaft positions.

In the strain gage type device a plurality of strain gages in the wheel drive shaft are fixed, and the torque is measured by constructing an electric bridge including these strain gages. The attaching of the respective gages is troublesome, and a telemeter or a slip ring is necessary for receiving electric signals.

With the conventional torsion torque detecting devices constructed as above, it is necessary to provide special devices for directly detecting the torque as in attaching strain gages, magnetostriction elements or the like to the wheel drive shaft for detecting the torsion torque, or installing coils for detecting the magnetostriction in the vicinity of the wheel drive shaft, and therefore, the installation thereof suffers various restrictions.

SUMMARY OF THE INVENTION

It is an object of the present invention to solve the above problems and to provide a torsion torque detecting device which does not require a special device for directly detecting a torque, and which is provided with a high degree of freedom of installation. Further, it is an object of the present invention to provide a slip detecting device which can indirectly detect a slip of wheels and a road friction coefficient detecting device which can indirectly calculate a road friction coefficient between a wheel and a road. Moreover, it is a further object of the present invention to provide a torsion torque detecting method which dose not require to directly detect the torque and which is provided with a high degree of freedom.

According to a first aspect of the present invention, there is provided a torsion torque detecting device comprising:

a power unit rotation velocity detecting means for detecting a rotation velocity of a power unit for driving a vehicle;

a power unit rotation acceleration calculating means for calculating a rotation acceleration of the power unit based on the rotation velocity of the power unit;

a power unit output torque calculating means for calculating an output torque of the power unit based on parameters of the power unit; and a torsion torque calculating means for calculating torsion torques of wheel drive shafts for driving wheels based on the rotation acceleration of the power unit and the output torque of the power unit.

According to a second aspect of the present invention, there is provided a torsion torque detecting device comprising:

an internal combustion engine rotation velocity detecting means for detecting a rotation velocity of an internal combustion engine for driving a vehicle;

an internal combustion engine rotation acceleration calculating means for calculating a rotation acceleration of the internal combustion engine based on the rotation velocity of the internal combustion engine;

an internal combustion engine output torque calculating means for calculating an output torque of the internal combustion engine based on parameters of the internal combustion engine; and a torsion torque calculating means for calculating torsion torques of wheel drive shafts for driving wheels based on the rotation acceleration of the internal combustion engine and the output torque of the internal combustion engine.

According to a third aspect of the present invention, there is provided a torsion torque detecting device comprising:

an internal combustion engine rotation velocity detecting means for detecting a rotation velocity of an internal combustion engine for driving a vehicle;

a transmission rotation velocity detecting means for detecting a rotation velocity of a transmission;

a transmission rotation acceleration calculating means for calculating a rotation acceleration of the transmission based on the rotation velocity of the transmission;

a transmission torque calculating means for calculating a transmission torque of the transmission based on an output torque of the internal combustion engine calculated from parameters of the internal combustion engine and a torque ratio calculated from the rotation velocity of the internal combustion engine and the rotation velocity of the transmission; an a torsion torque calculating means for calculating torsion torques of wheel drive shafts based on the rotation acceleration of the transmission and the transmission torque.

According to a fourth aspect of the present invention, there is provided a torsion torque detecting device comprising:

an in-braking power unit rotation velocity detecting means for detecting a rotation velocity of a power unit for driving a vehicle in braking wheels;

an in-braking power unit rotation acceleration calculating means for calculating a rotation acceleration of the power unit in braking from the rotation velocity of the power unit in braking; and a torsion torque calculating means for calculating torsion torques of wheel drive shafts for driving the wheels based on the rotation acceleration of the power unit in braking.

According to a fifth aspect of the present invention, there is provided a torsion torque detecting device comprising:

an in-braking transmission rotation detecting means for detecting a rotation velocity of a transmission in braking wheels;

an in-braking transmission rotation acceleration calculating means for calculating a rotation acceleration of the transmission in braking from the rotation velocity of the transmission in braking; and a torsion torque calculating means for calculating torsion torques of wheel drive shafts for driving the wheels based on the rotation acceleration of the transmission in braking.

According to a sixth aspect of the present invention, there is provided the torsion torque detecting device according to the second aspect or the third aspect, wherein the parameters are the rotation velocity of the internal combustion engine and a throttle opening of the internal combustion engine.

According to a seventh aspect of the present invention, there is provided the torsion torque detecting device according to the second aspect or the third aspect, wherein the parameters are the rotation velocity of the internal combustion engine and an intake pressure of the internal combustion engine.

According to an eighth aspect of the present invention, there is provided the torsion torque detecting device according to the second aspect or the third aspect, wherein the parameters are the rotation velocity of the internal combustion engine and a volumetric efficiency of the internal combustion engine.

According to a ninth aspect of the present invention, there is provided the torsion torque detecting device according to the first aspect, wherein the power unit is an induction motor driven by a power source having a variable voltage and a variable frequency.

According to a tenth aspect of the present invention, there is provided a slip detecting device wherein a slip of a wheel is detected based on a value of the torsion torque calculated by the torsion torque detecting device according to any one of the first aspect through the ninth aspect.

According to an eleventh aspect of the present invention, there is provided a road friction coefficient detecting device wherein a friction coefficient between a wheel and a road is calculated based on the torsion torque calculated by the torsion torque detecting device mans according to any one of the first aspect through the ninth aspect.

According to a twelfth aspect of the present invention, there is provided a torsion torque detecting method comprising the steps of:

calculating a rotation acceleration of a power unit for driving a vehicle by detecting a rotation velocity of the power unit;

calculating an output torque of the power unit based on parameters of the power unit; and calculating torsion torques of wheel drive shafts for driving wheels based on the rotation acceleration of the power unit and the output torque of the power unit.

According to a thirteenth aspect of the present invention, there is provided a torsion torque detecting method comprising the steps of:

calculating a rotation acceleration of an internal combustion engine for driving a vehicle by detecting a rotation velocity of the internal combustion engine;

calculating an output torque of the internal combustion engine based on parameters of the internal combustion engine; and calculating torsion torques of wheel drive shafts for driving wheels based on the rotation acceleration of the internal combustion engine and the output torque of the internal combustion engine.

According to a fourteenth aspect of the present invention, there is provided a torsion torque detecting method comprising the steps of:

calculating a rotation acceleration of a transmission by detecting a rotation velocity of an internal combustion engine for driving a vehicle and by detecting a rotation velocity of the transmission;

calculating torque ratio from the rotation velocity of the internal combustion engine and the rotation velocity of the transmission;

calculating a transmission torque of the transmission based on an output torque of the internal combustion engine calculated from parameters of the internal combustion engine and the torque ratio; and calculating torsion torques of wheel drive shafts for driving wheels based on the rotation acceleration of the transmission and the transmission torque.

According to the first aspect of the present invention, the output torque of the power unit can be calculated by the power unit output torque calculating means based on the parameters of the power unit. As the parameters of the power unit, for instance, in case of an internal combustion engine, there are an engine revolution number, a throttle opening, an intake pressure, a volumetric efficiency and the like, and the output torque can indirectly be calculated from these parameters. Further, the rotation acceleration of the power unit can be calculated by differentiating the detected rotation velocity of the power unit by the power unit rotation acceleration calculating means. The torsion torques applied on the wheel drive shafts are approximately expressed by a function of the output torque of the power unit and the rotation acceleration of the power unit. Accordingly, the torsion torques can be approximately calculated by the torsion torque calculating means based on the output torque of the power unit and the rotation acceleration of the power unit.

In this way, the torsion torques of the wheel drive shafts are indirectly calculated from the output torque and the rotation acceleration of the power unit. Therefore, the torsion torques can be detected without adding a special device for directly detecting the torques of the wheel drive shafts such as strain gages, magnetostriction elements or the like. Accordingly, there is no restriction in installing it or the like.

According to the second aspect of the present invention, the output torque of the internal combustion engine can be calculated by the internal combustion engine output torque calculating means based on the parameters of the internal combustion engine. Further, the rotation acceleration of the internal combustion engine can be calculated by differentiating the rotation velocity of the internal combustion engine by the internal combustion rotation acceleration calculating means. The torsion torques applied on the wheel drive shafts can be expressed approximately by a function of the output torque of the internal combustion engine and the rotation acceleration of the internal combustion engine. Accordingly, the torsion torques can approximately be calculated by the torsion torque calculating means based on the output torque of the internal combustion engine and the rotation acceleration of the internal combustion engine.

In this way, the torsion torques of the wheel drive shafts can indirectly be calculated by the output torque of and the rotation acceleration of the internal combustion engine. Accordingly, the torsion torques can be detected without adding a special device for directly detecting the torques, to the wheel drive shafts.

According to the third aspect of the present invention, the output torque of the internal combustion engine can be calculated by the internal combustion engine output torque calculating means based on he parameters of the internal combustion engine. The transmission torque of the transmission can be calculated based on the output torque of the internal combustion engine and the torque ratio which has been calculated from the rotation velocity of the internal combustion engine and the rotation velocity of the transmission. Further, the rotation acceleration of the transmission can be calculated by differentiating the rotation velocity of the transmission by the transmission rotation acceleration calculating means. The torsion torques applied on the wheel drive shafts can approximately be expressed by a function of the transmission torque and the rotation acceleration of the transmission. Accordingly, the torsion torques can approximately be calculated by the torsion torque calculating means based on the transmission torque and the rotation acceleration of the transmission.

In this way, the torsion torques of the wheel drive shafts are calculated indirectly from the output torque and the rotation acceleration of the transmission. Accordingly, the torsion torques can be detected without adding a special device for directly detecting the torques, to the wheel drive shafts.

According to the fourth aspect of the present invention, since the output torque of the power unit can be disregarded in braking, the torsion torques applied on the wheel drive shafts in braking can approximately be expressed as a function of the rotation acceleration of the power unit in braking. Accordingly, the torsion torques can approximately be calculated, and the torsion torques in braking can indirectly be detected.

According to the fifth aspect of the present invention, since the output torque of the internal combustion engine can be disregarded in braking, the torsion torque applied on the wheel drive shaft in braking can approximately be expressed as a function of the rotation acceleration of the transmission in braking. Accordingly, the torsion torques can approximately be calculated, and the torsion torques in braking can indirectly be detected.

According to the sixth aspect of the present invention, the output torque of the internal combustion engine is determined in correspondence with the rotation velocity and the throttle opening of the internal combustion engine, and therefore, the output torques can be calculated based on the throttle opening and the rotation velocity.

According to the seventh aspect of the present invention, the output torque of the internal combustion engine is determined in correspondence with the intake pressure and the rotation velocity of the internal combustion engine, and therefore, the output torques can be calculated based on the intake pressure and the rotation velocity.

According to the eighth aspect of the present invention, the output torque of the internal combustion engine is determined in correspondence with the rotation velocity and volumetric efficiency of the internal combustion engine, and therefore, the output torques can be calculated based on the rotation velocity and the volumetric efficiency.

According to the ninth aspect of the present invention, the output torques can be calculated based on the parameters such as a supply voltage, a frequency, the rotation velocity or a slip or the like, also in case wherein the power unit is an induction motor.

According to the tenth aspect of the present invention, the generation of the slip of the wheels can be detected based on the values of the torsion torques which have been calculated by the torsion torque detecting device, and therefore, the generation of the slip of the wheels can be detected indirectly and firmly.

According to the eleventh aspect of the present invention, the road friction coefficient between the wheel and the road can be calculated based on the value of the torsion torque which has been calculated by the torsion torque detecting device, and therefore, the road friction coefficient can be calculated indirectly and accurately.

According to the twelfth aspect of the present invention, the output torque of the power unit can be calculated based on the parameters of the power unit. As the parameters of the power unit, for instance, in case of the internal combustion engine, there are the engine rotation number, the throttle opening, the intake pressure, the volumetric efficiency and the like, and the output torque can indirectly be calculated from these parameters. The torsion torques applied on the wheel drive shafts can approximately be expressed by a function of the output torque of the power unit and the rotation acceleration of the power unit. Accordingly, the torsion torques can approximately be calculated by calculating the rotation acceleration of the power unit.

In this way, the torsion torques of the wheel drive shaft can indirectly be calculated from the output torque of the power unit and the rotation acceleration of the power unit. Therefore, the torsion torques can be detected without adding a special device for directly detecting the torques, to the wheel drive shaft.

According the thirteenth aspect of the present invention, the output torque of the internal combustion engine can be calculated based on the parameters of the internal combustion engine. The torsion torques applied on the wheel device shafts can approximately be expressed as a function of the output torque of the internal combustion engine and the rotation acceleration of the internal combustion engine. Therefore, the torsion torques can approximately be calculated by calculating the rotation acceleration of the internal combustion engine.

In this way, the torsion torques of the wheel drive shafts can indirectly be calculated from the output torque of the internal combustion engine and the rotation acceleration of the internal combustion engine. Therefore, the torsion torques can be detected without adding a special device for directly detecting the torques, to the wheel device shaft.

According to the fourteenth aspect of the present invention, the torsion torques applied on the wheel drive shafts can approximately be expressed as a function of the transmission torque and the rotation acceleration of the transmission. Accordingly, the torsion torques can approximately be calculated by calculating the transmission torque and the rotation acceleration of the transmission.

In this way, the torsion torque of the wheel drive shafts are indirectly calculated from the transmission torque and the rotation acceleration of the transmission. Therefore, the torsion torques can be detected without adding a special device for directly calculating the torques, to the wheel drive shaft.

BRIEF DESCRIPTION OF THE DRAWINGS

FIGS. 4(a) and 4(b) are diagrams showing models of a driving system in the example of FIG. 1, wherein FIG. 4(a) shows a model of a power transmission system, and FIG. 4(b) shows a model of a wheel unit.

FIGS. 9(a), 9(b) are diagrams of models of a driving system in the example of FIG. 7, wherein FIG. 9(a) shows a model of a power transmission system, and FIG. 9(b) shows a model of a wheel unit;

FIG. 13 is a block diagram showing the construction of an electronic circuit in the other example of this invention;

FIG. 14 is a characteristic diagram of an engine output showing a relationship between an engine rotation velocity and an engine output torque with a parameter of an intake pressure;

DETAILED DESCRIPTION OF THE PREFERRED EMBODIMENTS

EXAMPLE 1

Figure 1:
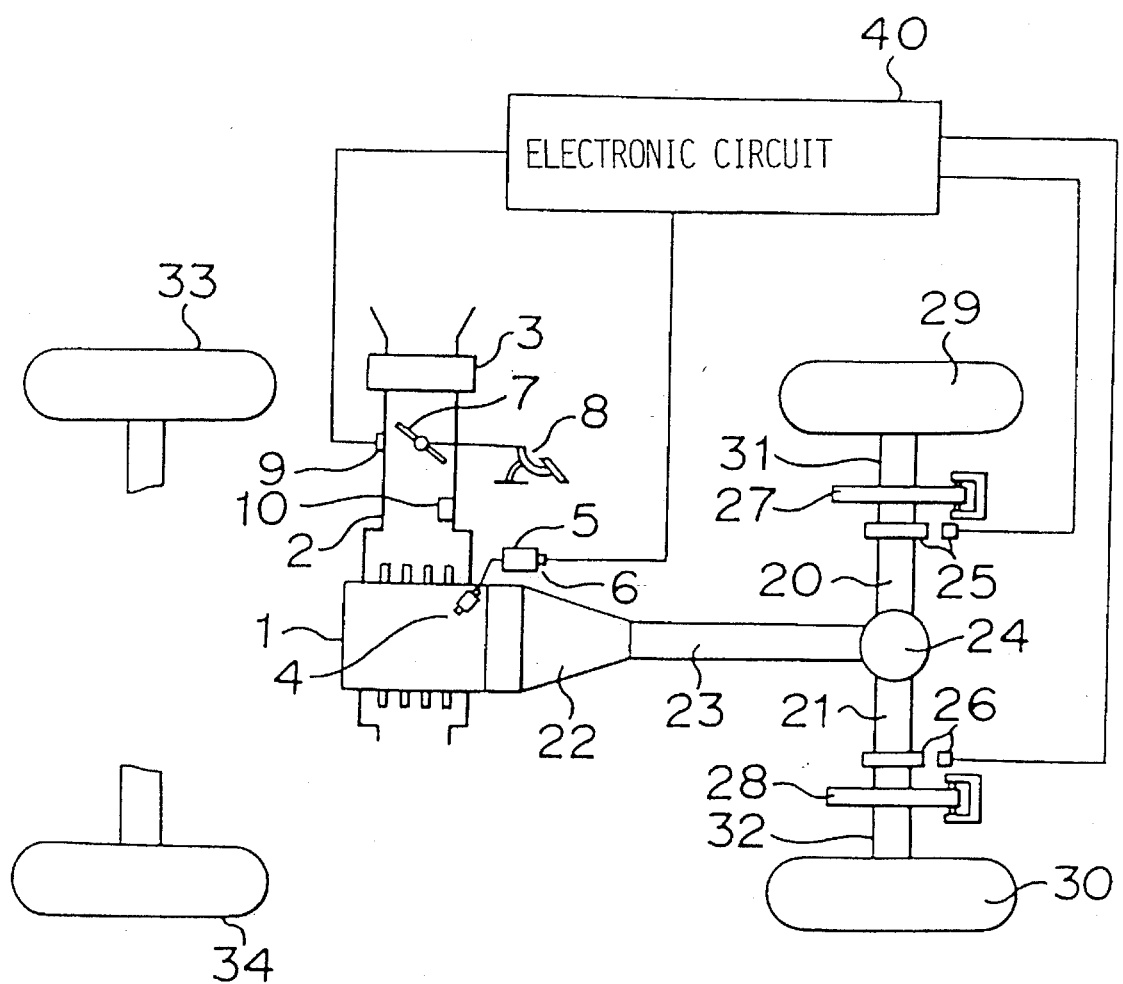
FIG. 1 is a construction diagram showing the total construction of an example of this invention in which a transmission is a manual transmission.
Figure 2:
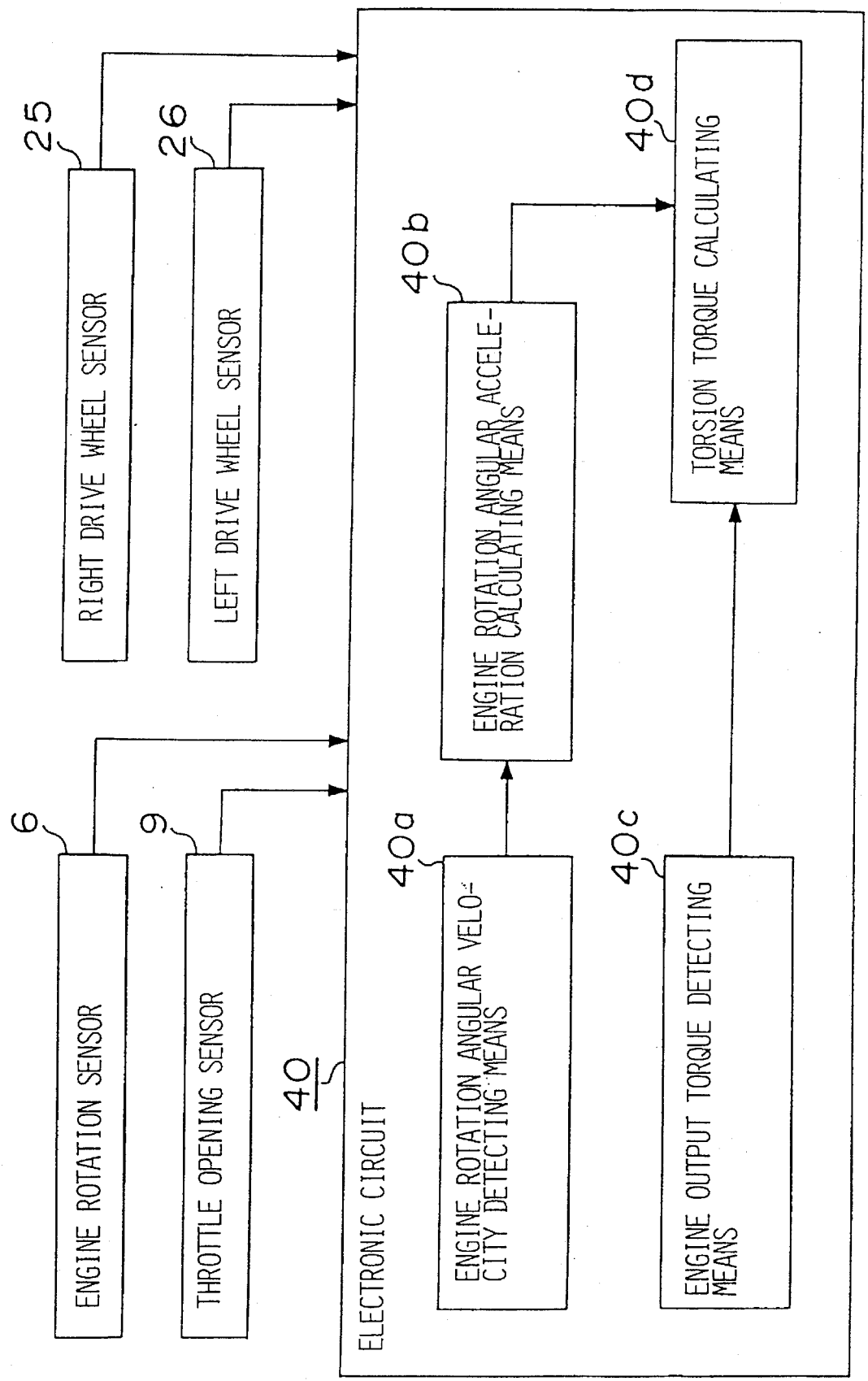
FIG. 2 is block diagram showing the construction of an electronic circuit in the example of FIG. 1.
Figure 3:
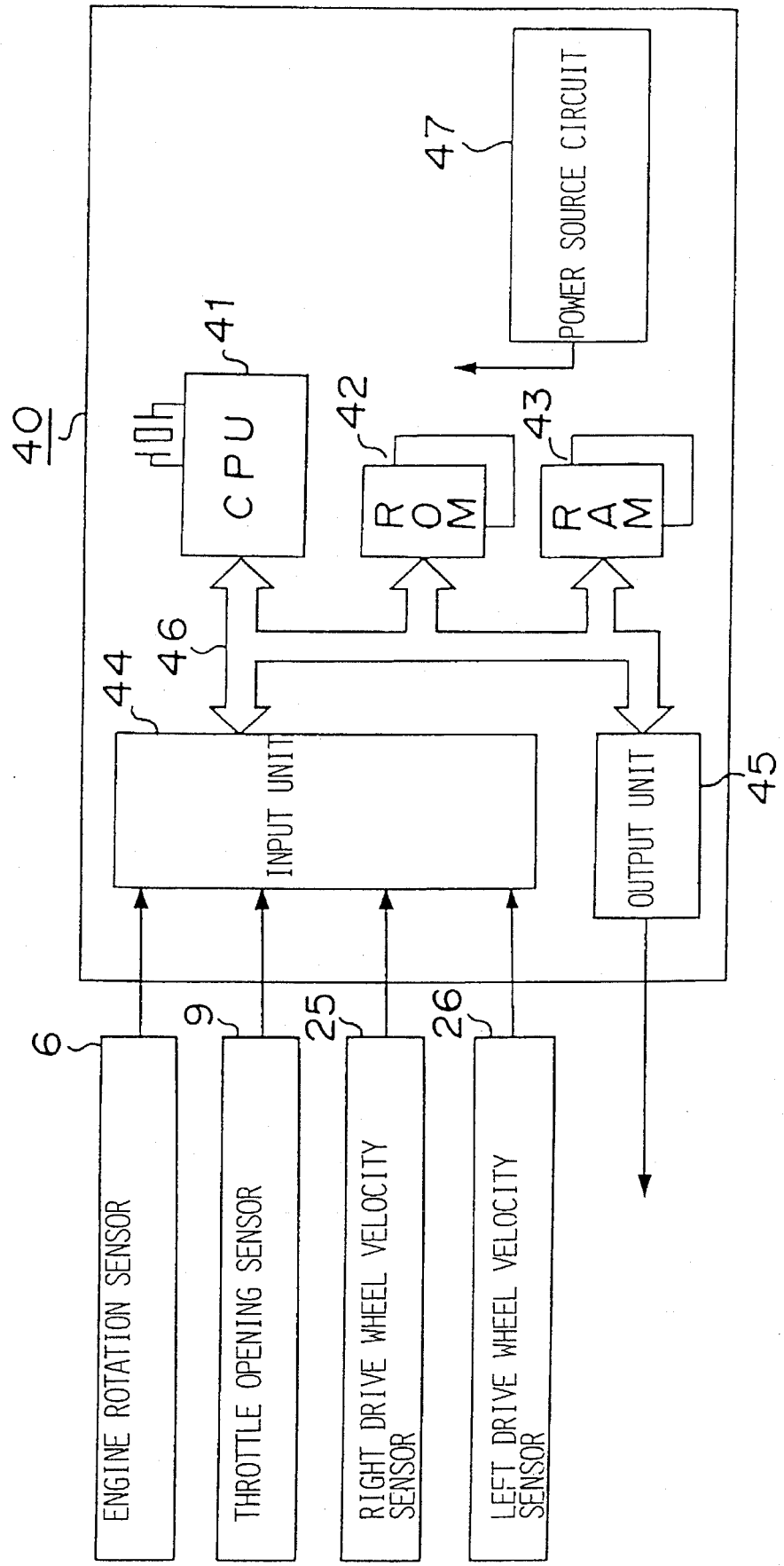
FIG. 3 is an internal connection diagram showing an internal connection of the electronic circuit in the example of FIG. 1.
Figure 5:
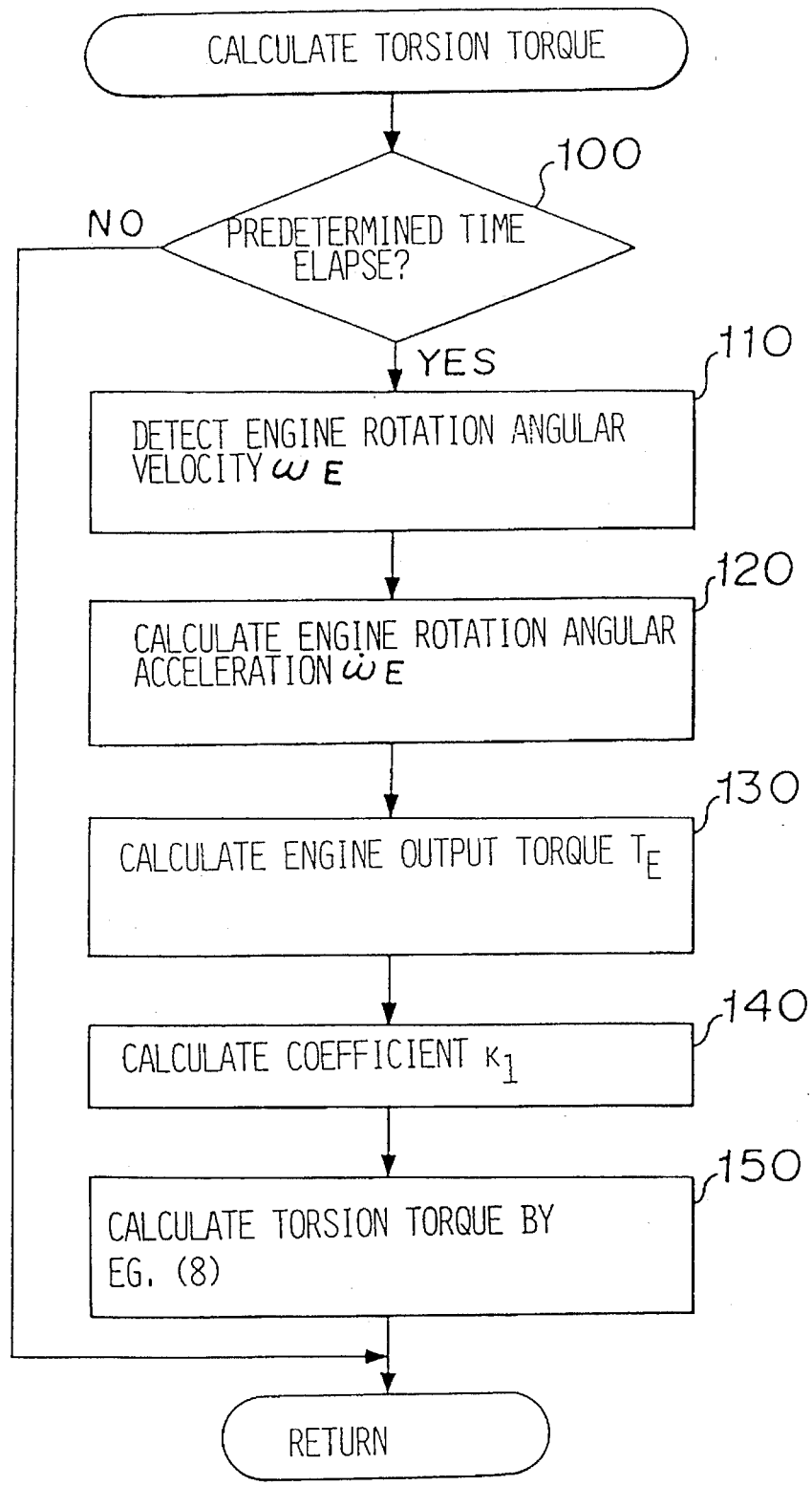
FIG. 5 is a flow chart showing the operation of the electronic circuit in the example of FIG. 1.
Figure 6:
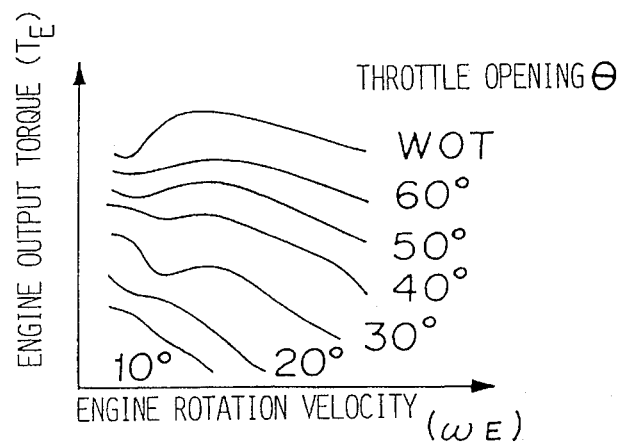
FIG. 6 is a characteristic diagram of an engine output showing a relationship between an engine rotation velocity and an engine output torque with a parameter of a throttle opening in the example of FIG. 1.

An explanation will be given of an example of this invention based on FIG. 1 through FIG. 6 as follows. FIG. 1 is a construction diagram showing the total construction in case wherein a transmission is a manual transmission, FIG. 2 shows a block diagram showing the construction of an electronic circuit, and FIG. 3 is an internal connection diagram showing an internal connection of the electronic circuit. FIGS. 4(a) and 4(b) are diagrams of a model of a driving system from an engine to wheels of an automobile, wherein FIG. 4(a) shows a model of a power transmission system, and FIG. 4(b) shows a model of a wheel unit. FIG. 5 is a flow chart showing the operation of an electronic circuit, and FIG. 6 is a characteristic diagram of an engine output showing a relationship between an engine rotation velocity and an engine output torque with a parameter of a throttle opening.

Further, this example is applied to an automobile of a front engine rear drive type (FR type) having a gasoline engine.

In FIG. 1, numeral 1 designates a four-cylinder fuel injection type engine as a power unit and as an internal combustion engine wherein gasoline is employed as fuel, numeral 2 designates an intake pipe, and numeral 3 designates an air flow meter of Karman's vortex type in which a flow rate of air sucked in the engine is measured by the frequency of Karman's vortex.

Numeral 4 designates an ignition plug (only one ignition plug for one cylinder is shown in FIG. 1), and numeral 5 designates a distributor which distributes high voltage to the ignition plugs 4 of the respective cylinders. Numeral 6 designates an engine rotation sensor, which is provided at the distributor 5 and which detects an engine rotation number by transmitting a predetermined number of pulses per one rotation.

Numeral 7 designates a throttle valve which is driven in accordance with an amount of pushing on an acceleration pedal 8 through a link mechanism, for controlling an intake amount of the engine. Numeral 9 designates a throttle opening sensor, which detects the throttle opening as a voltage signal in accordance with the opening, by a potentiometer (not shown) operating with the throttle valve 7.

Numeral 10 designates an intake pipe pressure sensor which measures a pressure in the intake pipe 2 on the rear side of the throttle valve 7 by using piezoelastic effect of a silicon chip.

Numerals 20 and 21 designate respectively right and left wheel drive shafts, to which power of the engine 1 is transmitted through a transmission 22, a main drive shaft 23, and a differential mechanism 24. Numerals 25 and 26 designate velocity sensors of right and left drive wheels, respectively, each of which is composed of a gear-shaped rotor and an electromagnetic pickup coil, and each of which generates an alternating current voltage having a frequency in accordance with the rotation number per unit time through a change in a clearance between the rotor rotating in synchronism with the wheel and the electromagnetic pickup coil, and accordingly, through a change in magnetic fluxes caused by a permanent magnet of the electromagnetic pickup coil.

Numerals 27 and 28 designate right and left brake devices provided to the drive shafts 20 and 21, and numerals 29 and 30 designate right and left drive wheels which are driven by the drive shafts 20 and 21. Numerals 31 and 32 designate shafts respectively disposed between the brakes 27 and 28 and wheels 29 and 30.

Further, numerals 33 and 34 designate right and left front wheels.

Numeral 40 designates an electronic circuit constructed by using a microcomputer. As shown in FIG. 2, the electronic circuit 40 is provided with an engine rotation angular velocity detecting means 40*a*, and an engine rotation angular acceleration calculating means 40*b*, an engine output torque detecting means 40*c* and a torsion torque calculating means 40*d*.

Further, the electronic circuit is connected to the engine rotation sensor 6, the throttle opening sensor 9, the right drive wheel sensor 25 and the left drive wheel sensor 26.

Further, the respective components of the electronic circuit 40 are internally connected as shown in FIG. 3.

In FIG. 3, numeral 41 designates a central processing unit (hereinafter, CPU) for inputting values detected by the respective sensors 6, 9, 25 and 26 and performing calculations in accordance with control programs. Numeral 42 designates a read only memory (hereinafter, ROM) in which the above control programs, a map of an engine output characteristic and data of the moment of inertia of an engine and the like, are stored.

Numeral 43 designates a random access memory (hereinafter, RAM) wherein the data from the above respective sensors and data necessary for calculation are temporarily read and written. Numeral 44 designates an input unit for outputting output signals from waveform shape circuits and the respective sensors to the CPU 41, and numeral 45 designates an output unit for outputting detected torsion torques to the outside. Numeral 46 designates a bus line which connects the CPU 41, the ROM 42 and the like with the input unit 44 and the output unit 45, and which is a passage of various data, and numeral 47 designates a power source circuit for supplying power source to the above respective units.

Before explaining the operation of the torsion torque detecting device constructed as above, an explanation will be given of the principle of a method of calculating torsion torques of the wheel drive shafts 20 and 21 by using model diagrams of FIGS. 4(*a*) and 4(*b*). Further, the torsion torques detected by this example designate the torques applied on the wheel drive shafts 20 and 21.

FIGS. 4(*a*) and 4(*b*) are model diagrams showing a model of a driving system from the engine 1 of an automobile to the wheels 29 and 30 wherein the engine transmission 22, the differential mechanism 24, the brakes 27 and 28 and the wheels 29 and 30 are connected with each other through the main drive shaft 23 and the wheel drive shafts 20 and 21 each having a torsional rigidity. Further, the total velocity reduction ratio including the velocity change ratio from the engine 1 to the wheels 29 and 30, is incorporated in the transmission 22.

A torque is transmitted among the engine, the differential mechanism, the brakes and the wheels, through the shafts each having a torsional rigidity, which connect the respective portions. The torque caused by the engine 1 is amplified by the transmission 22 and is transmitted to the propeller shaft 23.

Defining the output torque of the engine 1 as $T_E$, the moment of inertia of the engine 1 and the transmission 22, as $I_E$, the rotation angular velocity of the engine, as $\omega_E$, the total velocity reduction ratio including the velocity change ratio from the engine to the wheels, as $k_T$, the torsional rigidity coefficient of the main drive shaft 23, as $K_P$, and the torsional angle of the shaft, as $\theta_P$, the equation of motion with respect to the engine is established as follows.

$$k_T \cdot I_E (d\omega_E/dt) = k_P \theta_P + k_T \cdot T_E \quad (1)$$

Further, the direction (arrow mark A in FIG. 4(*a*)) in which the wheels drive the engine is determined to be positive.

In this case, defining the rotation angular velocities of the respective left and right drive wheels as $\omega_L$ and $\omega_R$, since in the differential mechanism 24, there is a relationship in which the input rotation velocity is equal to an average value of the two output rotation velocities, the total velocity reduction ratio ratio $k_T$ including a velocity change ratio from the engine to the differential mechanism, is shown as follows by expressing it by a ratio of the engine angular velocity $\omega_E$ of the engine as compared with $(\frac{1}{2})(\omega_1 + \omega_R)$.

$$k_T = (\omega_1 + \omega_R)/2\omega_E \quad (2)$$

The differential mechanism 24 is transmitted with a torque from the engine 1 as a torque $k_P \theta_P$ of the shaft 23.

The moment of inertia of the differential mechanism is defined as $I_D$, the rotation angular velocity of the differential mechanism is defined as $\omega_D$, the torsional rigidity coefficient of the wheel drive shaft between the differential mechanism and the brake is defined as $k_D$, and the torsional angle of the wheel drive shaft between the differential mechanism and the brake is defined as $\theta_D$. The torsion torque $k_P \theta_P$ operating on the shaft 23 in the differential mechanism is distributed to the right and left wheel drive shafts 20 and 21 in the differential mechanism. When the distribution coefficient is defined as $k_{TD}$, the equation of motion with respect to the differential mechanism is established as follows.

$$I_D \cdot (d\omega_D/dt) = k_D \theta_D - k_{TD} \cdot k_P \theta_P \quad (3)$$

In a normal differential mechanism, $k_{TD} = \frac{1}{2}$.

The torque from the differential mechanism 24 is transmitted from the brakes 27 and 28 as the torques $k_D \theta_D$ of the wheel drive shafts 20 and 21.

When the moment of inertia of the brakes 27 or 28 is defined as $I_B$, the rotation angular velocity of the brake is defined as $\omega_B$, the brake torque is defined as $T_B$, the torsional rigidity coefficient of the shaft 31 or 32 between the brake and the wheel is defined as $K_B$, and the torsional angle of the shaft 31 or 30 is defined as $\theta_B$, the equation of motion with respect to the brake is established as follows.

$$I_B \cdot (d\omega_B/dt) = k_B \theta_B - k_D \theta_D \quad (4)$$

The torques from the brakes 27 and 28 are transmitted to the wheels 29 and 30 as the torques $k_B \theta_B$ of the shafts 31 and 32 between the brakes and the wheels.

Defining the effective radius of wheels as r, the force from the road, as F, the moment of inertia of wheel, as $I_W$ and the rotation angular velocity of wheel, as $\omega_W$, the equation of motion is established as follows with respect to the wheel.

$$I_W (d\omega_W/dt) = F \cdot r - k_B \theta_B \quad (5)$$

Incidentally, the direction of the rotation of wheel when the automobile moves forward (direction of arrow mark B in FIG. 4(*a*)) is determined to be positive.

Further, with respect to the torque from the road, the torque is transmitted in the reverse direction to the engine through the main drive shaft 23 which is the torque transmitting shaft having a torsional rigidity which connects the engine 1, the differential mechanism 24, the brakes 27 and 28 and the wheels 29 and 30, along with the wheel drive shafts 20 and 21, and the shafts 31 and 32.

The torsion torque $k_P \theta_P$ which is detected by this example is derived from equation (1) as follows.

$$k_P \theta_P = k_T \cdot \{I_E \cdot (d\omega_E/dt) - T_E\} \quad (6)$$

Further, the following equation is established from the equations (1) and (3).

$$k_D\theta_D = I_D \cdot (d\omega_D/dt) + k_{TD} \cdot k_T \{I_E \cdot (d\omega_E/dt) - T_E\} \quad (7)$$

In the above equation (7), the first term of the right hand side of the equation can be disregarded when the moment of inertia $I_D$ of the differential mechanism 24 is sufficiently small. By substituting $k_{TD} \cdot k_T$ for a coefficient k1 ($=k_{TD} \cdot k_T$) which corresponds to the total velocity reduction ratio $k_{TD}$ including the velocity change ratio from the engine 1 to the wheels 29 and 30 and the above distribution coefficient $k_{TD}$ in the differential mechanism, the following equation is established.

$$k_D\theta_D = k1 \cdot \{I_E \cdot (d\omega_E/dt) - T_E\} \quad (8)$$

Further, from the equations (1), (3) and (4), the following equation is established.

$$k_B\theta_B = I_B \cdot (d\omega_E/dt) + k_D\theta_D \quad (9)$$

By disregarding the moment of inertia of the brake $I_B$, the following equation is established.

$$k_B\theta_B = k_D\theta_D \quad (10)$$

As stated above, the torsion torque can be calculated without adding a special device for directly detecting the torque.

Even in the case of rapidly braking the wheels, the torsion torque of the main drive shaft 23 or those of the wheels drive shafts 20 and 21 can be calculated by equation (6) or the equation (7).

The torsion torques of the shafts 31 and 32 between the brakes and the wheels can be expressed as follows wherein the brake torque $T_B$ is introduced into the equation (4) which is the equation of the motion with respect the brake.

$$I_B \cdot (d\omega_B/dt) = k_B\theta_B - k_D\theta_D - T_B \quad (11)$$

Therefore, by disregarding the moment of inertia of the brake $I_B$, the following equation is established.

$$k_B\theta_B - k_D\theta_D = T_B \quad (12)$$

For instance, when the brake torque $T_B$ is detected by some method, such as calculating the brake torque by detecting the brake pressure, the torsion torques of the shafts 31 and 32 between the brakes and the wheels can be detected in accordance with the equation (11).

Next, an explanation will be given of the operation of calculating the torsion torque of the wheel drive shafts 20 and 21 which is carried out by the electronic circuit 40 based on the above principle, in accordance with the flow chart shown in FIG. 5.

First, in step 100, the operation determines whether a predetermined time, for instance, 5 (msec) or more has elapsed after the torque calculation was performed in the previous processing, and finishes the processing of this routine when the predetermined time has not elapsed. When the predetermined time has elapsed, the operation proceeds to step 110. That is, this step 100 is the processing for performing the torsion torque calculation at every predetermined time.

In step 110, the engine rotation angular velocity detecting means 40a calculates the engine rotation angular velocity $\omega_E$ by counting a number of pulses N per unit time based on the detection signal from the engine rotation sensor 6.

Next, in step 120, the engine rotation angular acceleration calculation means 40b calculates the engine rotation angular acceleration ($d\omega_E/dt$) from a difference between the engine rotation angular velocity $\omega_E(n-1)$ which has been calculated in the previous step 110, and the current engine rotation angular velocity $\omega_E$, and an elapse time, and the operation proceeds to step 130.

In step 130, the engine output torque detecting means 40c calculates the engine output torque $T_E$ through the parameters of the throttle opening $\theta$ detected by the throttle opening sensor 9 and the engine rotation angular velocity $\omega_E$ which has been calculated in step 110, through engine characteristic data memorized in the ROM 40 which are predetermined as shown in FIG. 6.

In step 140, the torsion torque calculating means 40d calculates the rotation angular velocities $\omega_L$ and $\omega_R$ of the respective left and right drive wheels by counting numbers of pulses per unit time of the detection signals from the right and left drive wheel sensors 25 and 26. Further, since the differential mechanism 24 is in a relationship wherein the input rotation velocity is equal to a mean value of the two output rotation velocities, the operation calculates the total velocity reduction ratio $k_T$ including the speed change ratio from the engine to the differential mechanism by expressing it by the ratio of the engine rotation angular velocity $\omega_E$ which has been calculated in step 110, as compared with $(\frac{1}{2})(\omega_L + \omega_R)$, as shown by the following equation (2).

$$k_T = (\omega_L + \omega_R)/2\omega_E$$

The operation calculates the coefficient k1 which corresponds to the total velocity reduction ratio $k_T$ and the distribution coefficient $k_{TD}$ in the differential mechanism as shown by the following equation, and proceeds to the next step.

$$k1 = k_{TD} \cdot k_T$$

In step 150, the torsion torque calculation means 40d calculates the torsion torque $k_D\theta_D$ by the engine rotation angular acceleration ($d\omega_E/dt$), the engine output torque $T_E$ and the coefficient k1 which have been calculated in steps 120 through 140 as shown by the following equation (8).

$$k_D\theta_D = k1\{I_E \cdot (d\omega_E/dt) - T_E\}$$

In this case, a predetermined value stored in the ROM 42 is used for the moment of inertia $I_E$ for the engine system.

Further, in this example, the total velocity reduction ratio $k_T$ from the engine 1 to the wheels 29 and 30 is calculated by the equation (2). However, the total velocity reduction ratio may be derived by other method, for instance, from a ratio of a vehicle velocity as compared with the engine rotation number, or the like.

As stated above, in Example 1, the processings of step 110 through step 150 are carried out at every predetermined time, and the torsion torque is calculated. Therefore, the torsion torque can be detected without adding a special device for directly detecting the torque, to the wheel drive shaft as in the conventional case.

Further, with respect to the sensors used in this example, sensors used in other control systems of an automobile, for instance, in a traction control system or a fuel injection system of an engine, are also employed as the sensors in this Example. Therefore, it is not necessary to add a special device for directly detecting the torque and therefore, the invention is inexpensive in comparison with the conventional torque detection device and the degree of freedom of installation or the like is improved.

EXAMPLE 2

Figure 7:
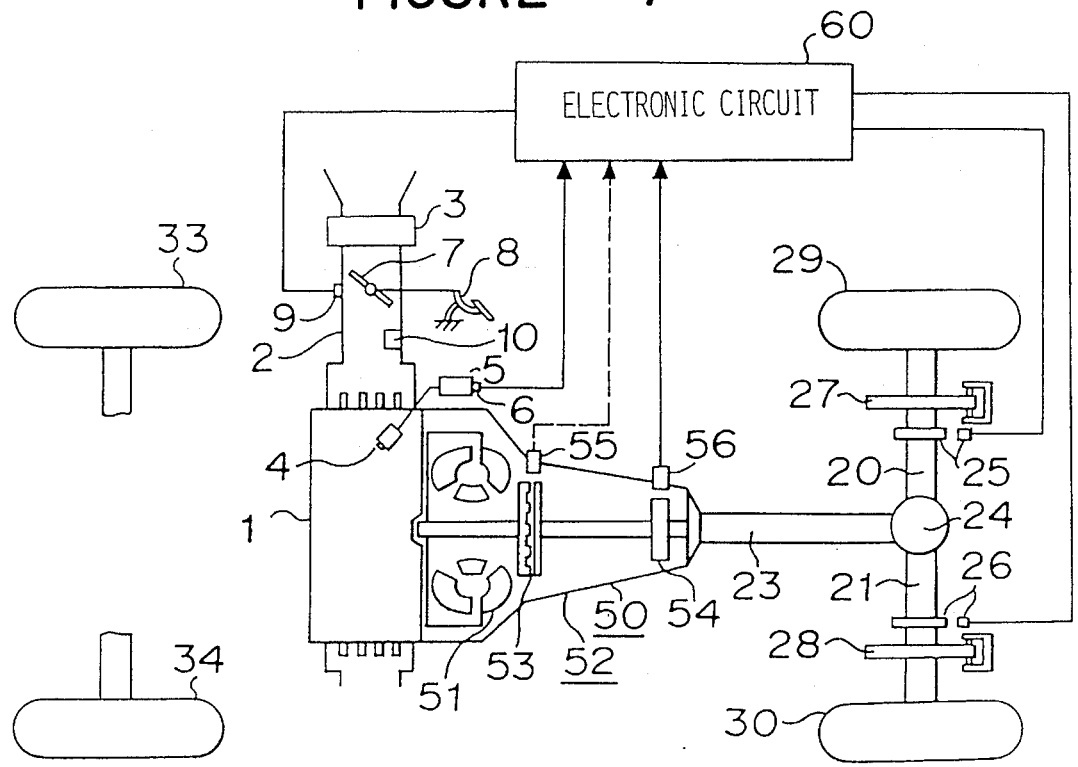
FIG. 7 is a construction diagram showing a total construction of other example of this invention, wherein the transmission is an automatic transmission.
Figure 8:
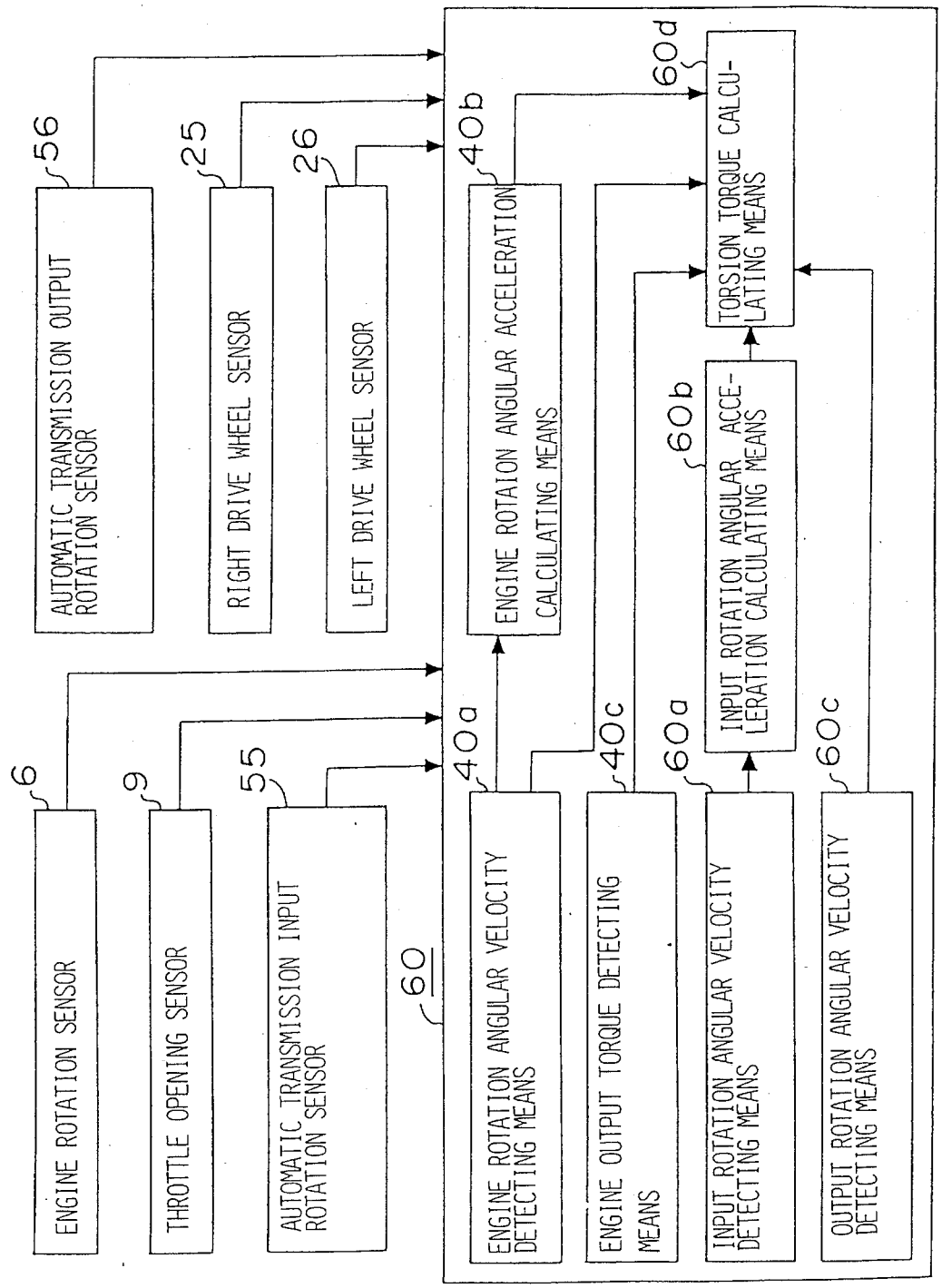
FIG. 8 is block diagram showing the construction of an electronic circuit in the example of FIG. 7.
Figure 9A:
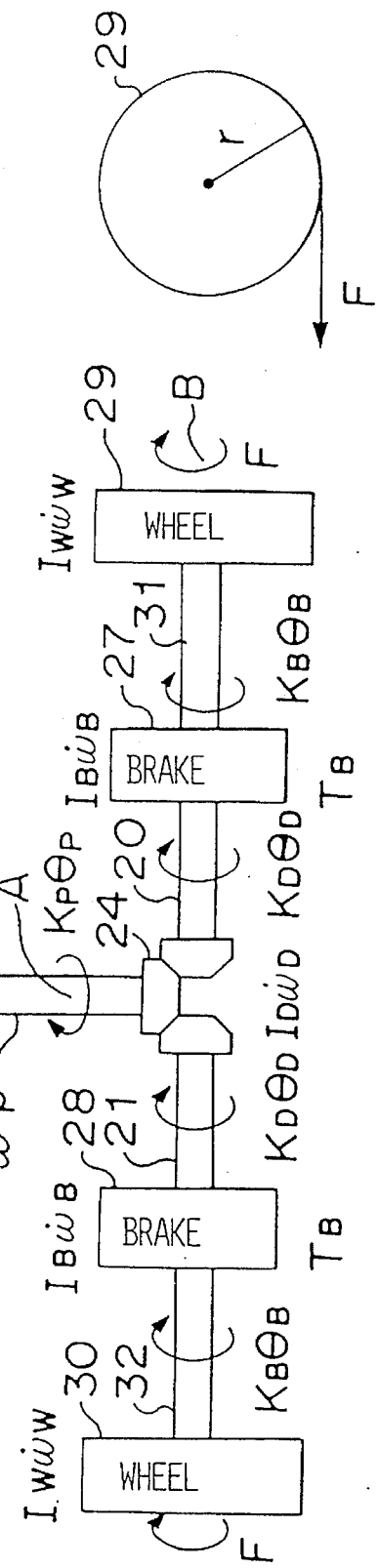
Figure 9B:
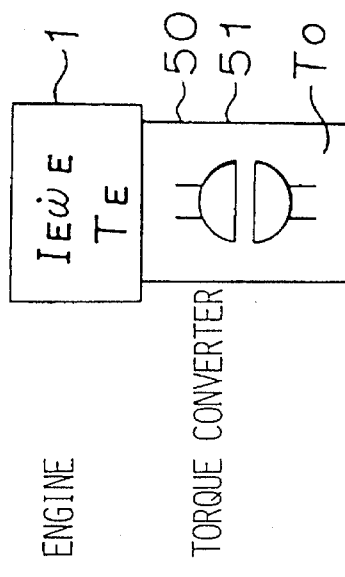
Figure 10:
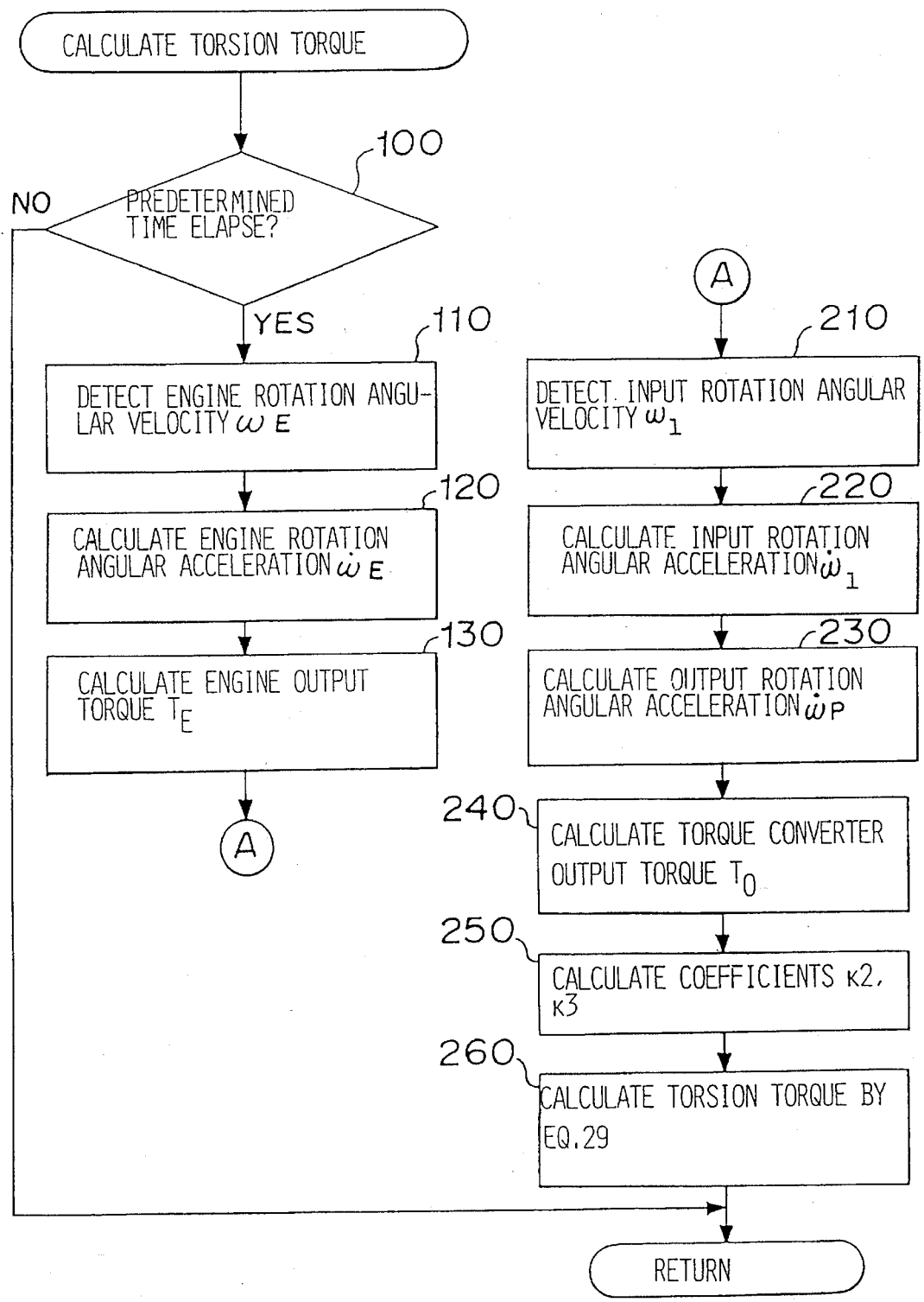
FIG. 10 is a flow chart showing the operation of the electronic circuit in the example of FIG. 7.
Figure 11:
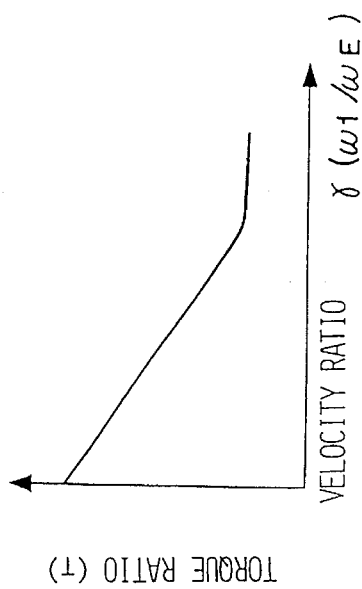
FIG. 11 is a torque converter characteristic diagram showing a characteristic of a torque converter in the example of FIG. 7.

An explanation will be given of another Example of this invention in reference to FIG. 7 through FIG. 11. FIG. 7 is a construction diagram showing the total construction in case wherein the transmission is an automatic transmission, and FIG. 8 is a block diagram showing the construction of an electronic circuit. FIGS. 9(a) and 9(b) are model diagrams of a model of a driving system from the engine to the wheels of an automobile, wherein FIG. 9(a) shows a model of a power transmitting system, and FIG. 9(b) shows a model of a wheel unit. FIG. 10 is a flow chart showing the operation of the electronic circuit. FIG. 11 illustrates the torque converter characteristic diagram showing a relationship between a ratio ($\omega_1/\omega_E$) of the automatic transmission input rotation angular velocity as compared with the engine rotation velocity, which is stored in the ROM 42 as a map.

In FIG. 7, numeral 50 designates an automatic transmission, numeral 51 designates a torque converter in the automatic transmission 50, numeral 52 designates a change gear train, numeral 53 designates an overdrive clutch, and numeral 54 designates an output shaft of the change gear train 52. Numeral 55 designates an automatic transmission input rotation sensor which is provided with a rotor attached to an outer peripheral portion of the overdrive clutch 53 and a magnetic pickup attached to the housing and which detects the input rotation number of the change gear train of the automatic transmission. Numeral 56 designates an automatic transmission output rotation sensor, which is installed to the output shaft 54 and which detects the rotation number of the output shaft 54 of the change gear train by a rotor emitting four pulse signals per one rotation of the output shaft 54 and a pickup. The numeral 60 designates an electronic circuit.

The the other construction is the same as in Example 1 shown by FIG. 1, and therefore, the corresponding portion is attached with the same notation and the explanation will be omitted.

Next, an explanation will be given of a detailed construction of the electronic circuit 60. In FIG. 8, the electronic circuit 60 is provided with an input rotation angular velocity detecting means 60a, an input rotation angular acceleration calculating means 60b, an output rotation angular velocity detecting means 60c and a torsion torque calculating means 60d. Further, the electronic circuit 60 is connected to the engine rotation sensor 6, the throttle opening sensor 9, the right drive wheel sensor 25, the left drive wheel sensor 26, the automatic transmission input rotation sensor 55 and the automatic transmission output sensor 56.

Further, in the electronic circuit 60, the respective components as in Example 1 shown by FIG. 3 are internally connected.

Before explaining the operation, an explanation will be given of the principle of the torsion torque calculating method of the wheel drive shafts 20 and 21 which is carried out in the electronic circuit 60 by using the model diagrams of FIG. 9(a) and FIG. 9(b). Further, the torsion torques which are detected by Example 2 are torques operating on the wheel drive shafts 20 and 21.

In FIGS. 9(a) and 9(b), the torque from the engine 1 is transmitted to the change gear train 52 in accordance with the torque converter characteristic of FIG. 11.

Defining the output torque of the torque converter 51 as $T_0$, and the torque ratio of the torque converter, as t, the following equation is established.

$$T_0 = t \cdot T_E \quad (21)$$

In this equation, the torque ratio t of the torque converter 51 is expressed as a function of a velocity ratio of the automatic transmission input rotation angular velocity (torque converter output rotation angular velocity) $\omega_1$ as compared with the engine rotation angular velocity $\omega_E$, and accordingly the velocity ratio $\gamma$ is expressed by the following equation.

$$\gamma = \omega_1/\omega_E \quad (22)$$

The velocity reduction ratio $k_{TA}$ from the detection position of the automatic transmission input rotation angular velocity $\omega_1$, that is, the installation location of the automatic transmission input rotation sensor 55 to the wheels 29 and 30, is shown by the following equation.

$$k_{TA} = (\omega_R + \omega_L)/2\omega_1 \quad (23)$$

The equation of motion at the transmission portion is expressed as follows by using the automatic transmission input rotation angular velocity $\omega_1$ and the output torque $T_0$ of the torque converter.

$$k_{TA} \cdot I_E (d\omega_1/dt) = k_P \theta_P + k_{TA} \cdot T_0 \quad (24)$$

The torsion torque is calculated from the equations (3) and (24) as follows wherein $I_D$ is disregarded since it is sufficiently small.

$$k_D \theta_D = k2 \cdot I_E (d\omega_1/dt) - k2 \cdot T_0 \quad (25)$$

where k2 is a coefficient which corresponds to the total velocity reduction ratio including the velocity change ratio from the installation location of the automatic transmission input rotation sensor 55 to the wheels 29 and 30 and distribution coefficient kTD in the differential mechanism 24, which is expressed as follows.

$$k2 = k_{TD} \cdot k_{TA} \quad (26)$$

Further, the velocity reduction ratio $k_{T2}$ from the detection location of the automatic transmission output rotation angular velocity $\omega_P$, that is, the installation location of the automatic transmission output rotation sensor 56 to the wheels 29 and 30, is expressed as follows.

$$k_{T2} = (\omega_R + \omega_L)/2\omega_P \quad (27)$$

The equation of motion at the transmission portion is expressed as follows using the automatic transmission output rotation angular velocity $\omega_P$ and the output torque $T_0$ of the torque converter.

$$k_{T2} \cdot I_E (d\omega_P/dt) = k_P \theta_P + k_{TA} \cdot T_0 \quad (28)$$

The torsion torque is calculated from the equations (3) and (28) wherein $I_D$ is disregarded since it is sufficiently small.

$$k_D \theta_D = k3 \cdot I_E (d\omega_P/dt) - k2 \cdot T_0 \quad (29)$$

In this equation, k3 is a coefficient which corresponds to the total velocity reduction ratio including the velocity change ratio from the installation location of the automatic transmission output rotation sensor 56 to the wheels 29 and 30 and the distribution coefficient $k_{TD}$ in the differential mechanism 24, which is expressed as follows.

$$k3 = k_{TD} \cdot k_{T2} \quad (30)$$

An explanation will be given of the operation of the electronic circuit 60 which operates based on the above principle, in reference to the flow chart of FIG. 10.

The processings in steps 100 through 130 are the same as in Example 1 shown by FIG. 5. That is, in step 100, the operation determines whether a predetermined time or more has elapsed or not after the torsion torque calculation was performed in the previous processing, and proceeds to step 110 when the predetermined time has elapsed. In step 110, the operation calculates the engine rotation angular velocity $\omega_E$ by counting a number of pulses N per unit time, based on the detection signal from the engine rotation sensor 6. Next, in step 120, the operation calculates the engine rotation angular acceleration ($d\omega_E/dt$) and proceeds to step 130. In step 130, the operation calculates the engine output torque $T_E$ in accordance with the engine characteristic shown by FIG. 6, and proceeds to step 210.

In step 210, the operation calculates the input rotation angular velocity $\omega_1$ of the automatic transmission by the input rotation angular velocity detecting means 60a based on the detection signal from the automatic transmission input rotation sensor 55.

In step 220, the operation calculates the automatic transmission input rotation angular acceleration ($d\omega_1/dt$) by differentiating the detected input rotation angular velocity $\omega_1$ of the automatic transmission by the input rotation angular acceleration calculating means 60b.

In step 230, the operation calculates the output rotation angular velocity $\omega_P$ of the automatic transmission by the output rotation angular velocity detecting means 60c based on the detection signal from the automatic transmission output rotation sensor 56.

In step 240, the operation calculates the velocity ratio $\gamma$ (=$\omega_1/\omega_E$) of the input rotation angular velocity of $\omega_1$ of the automatic transmission which has been calculated in step 210, as compared with the engine rotation angular velocity $\omega_E$ which has been calculated in step 110 and calculates the torque ratio t of the torque converter in accordance with the torque converter characteristic shown by FIG. 11 which is memorized in the ROM 42 through the torsion torque calculating means 60d which also is the transmission torque calculating means.

Further, the operation calculates the output torque $T_O$ (=$t \cdot T_E$) which is the transmission torque, by equation (21).

In step 250, the operation calculates the coefficient k2 (=$k_{TD} \cdot k_{TA}$) which corresponds to the total velocity reduction ratio including the velocity change ratio from the torque converter 51 (the installation position of the automatic transmission input rotation sensor 55) to the differential mechanism 24 and the distribution coefficient in the differential mechanism, and calculates the coefficient k3 (=$k_{TD} \cdot k_{T2}$) which corresponds to the total velocity reduction ratio including the velocity change ratio from the installation position of the automatic transmission output rotation sensor 56 to the wheels 29 and 30 and the distribution coefficient $k_{TD}$ in the differential mechanism, in accordance with the equations (26) and (27) by the torsion torque calculating means 60d.

In step 260, the operation calculates the torsion torque in accordance with the equation (29) by the torsion torque calculation means 60d which is shown below.

$$k_D\theta_D = k3 \cdot I_E (d\omega_P/dt) - k2 \cdot T_0$$

Further, in case of calculating the torsion torque by using the equation (25), the operation processes steps 250 and 260 as follows.

In step 250, the operation calculates the coefficient k2 (=$k_{TD} \cdot k_{TA}$) which corresponds to the total velocity reduction ratio including the velocity change ratio from the torque converter 51 (installation location of the automatic transmission input rotation sensor 55) to the differential mechanism 24 and the distribution coefficient in the differential mechanism, by the torque calculating means 60d. In this case, it is not necessary to calculate the automatic transmission output rotation angular velocity $\omega_P$ in step 230.

In step 260, the operation calculates the torsion torque in accordance with the equation (25) which is shown as follows, by the torsion torque calculation means 60d.

$$k_D\theta_D = k2 \cdot I_E (d\omega_1/dt) - k2 \cdot T_0$$

As stated above, also in Example 2, the torsion torque is calculated at every predetermined time, and therefore, the torsion torque can be detected without adding a special device for directly detecting the torque, to the wheel drive shaft as in the conventional case. Further, the sensors used in Example 2 are sensors utilized in other control system of an automobile, for instance, a traction control system and a fuel injection system of the engine and therefore, the invention is inexpensive in comparison with the conventional torque detecting device.

In Example 1 or Example 2, the rotation angular velocity and the output torque at an arbitrary member which is in the vicinity of the engine and wherein torsion is not caused, are detected by using existing sensors employed in other systems of an automobile, the coefficient k1 of equation (8) or the coefficients k2 and k3 by the equation (26) and (30) are selected pertinently in accordance with the installation locations of the sensors, by which the torsion torque can be detected without adding a special device for directly detecting the torque, to the wheel drive shaft.

In this case, it is important to detect the rotation angular velocity of a member wherein the torsion is not caused. When the torsion is not caused, ($d\omega_E/dt$), ($d\omega_1/dt$) or ($d\omega_P/dt$) can be provided by calculation. However, when the torsion is caused, the torsion is oscillating, and therefore, it is not possible to obtain ($d\omega_E/dt$), ($d\omega_1/dt$) or ($d\omega_P/dt$) through calculation. Therefore, the torsion torque can not be detected by detecting rotation angular velocity at a member wherein torsion is caused, for instance, at the wheel or the brake.

EXAMPLE 3

In the model diagrams of FIGS. 4(a) and 4(b) in braking, a driver takes off his foot from an acceleration pedal and pushes on the brake. At this instance, the throttle valve 7 (FIG. 1) is fully closed and therefore, the engine output torque $T_E$ can be disregarded. Therefore, the equation (8) for calculating the torsion torques of the drive shafts 20 and 21 is expressed by the following equation (31).

$$k_D\theta_D = k1 \cdot I_E (d\omega_E/dt) \tag{31}$$

Accordingly, instead of the electronic circuit 40 in FIG. 1, the torsion torque can be calculated as follows by using an electronic circuit 70 shown by a block diagram of FIG. 12. The electronic circuit 70 comprises an in-braking engine rotation angular velocity detecting means 70a, an in-braking engine rotation angular acceleration calculating means 70b and a torsion torque calculating means 70d. The necessary sensors in this case are the engine rotation sensor 6, the right drive wheel sensor 25 and the left drive wheel sensor 26 as shown in FIG. 12.

The engine rotation angular velocity $\omega_E$ in braking is detected by the in-braking engine rotation angular velocity detecting means 70a, the engine rotation angular acceleration ($d\omega_E/dt$) in braking is calculated by the in-braking engine rotation angular acceleration calculating means 70b, and the torsion torque $k_D\theta_D$ can be calculated in accordance with the above equation (31), by using the moment of inertia $I_E$ of the engine which has previously been memorized in a memory device (not shown) of the electronic circuit 70.

Figure 12:
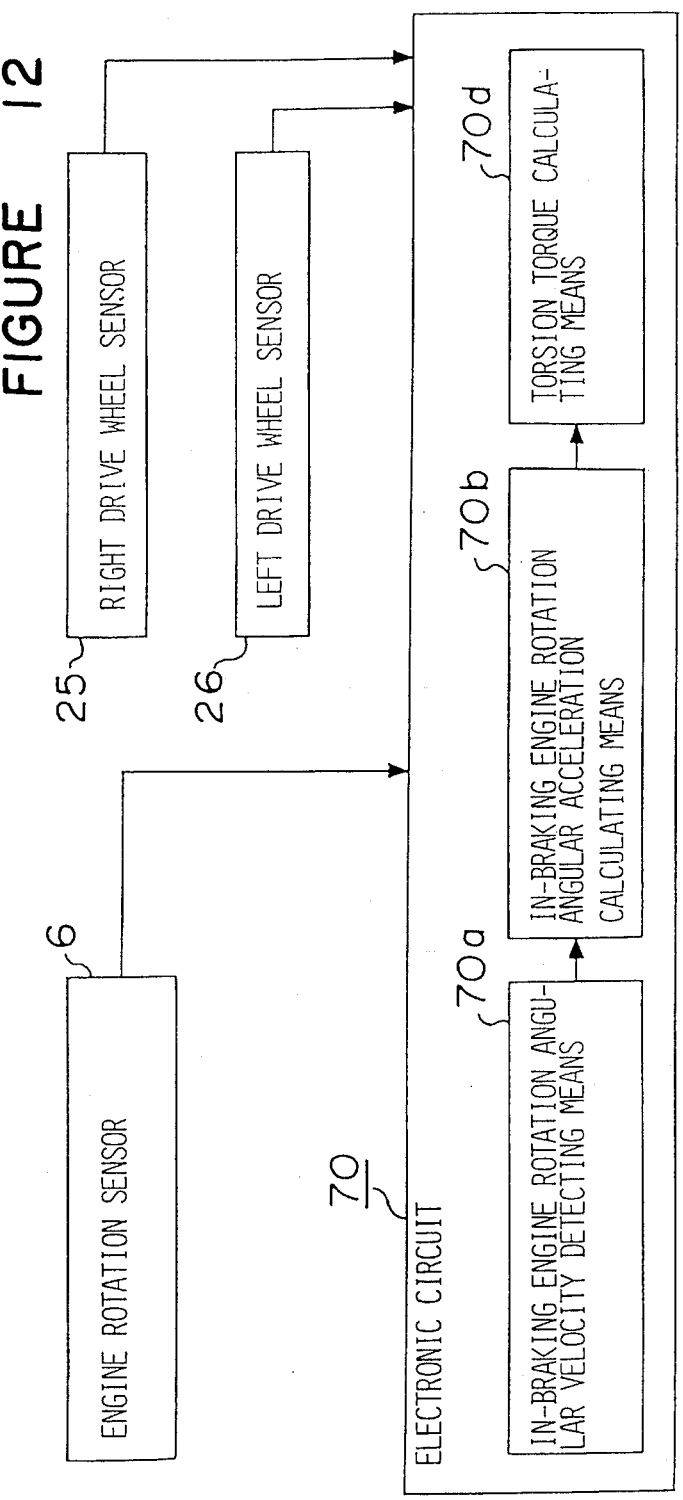
FIG. 12 is a block diagram showing the construction of an electronic circuit in other example of this invention.

Further, instead of the electronic circuit 70 shown by FIG. 12, it is possible to calculate the torsion torque by using the equation (31) based on a calculation result from the engine rotation angular velocity detecting means 40a and the engine rotation angular acceleration calculating means 40b in braking and through the torsion torque calculating means 40d.

EXAMPLE 4

Similarly, also in case wherein the transmission is an automatic transmission, in braking, the engine output torque can be disregarded as above, and therefore, the equation (25) for calculating the torsion torques of the wheel drive shafts 20 and 21 can be expressed by the following equation (41).

$$k_D\theta_D = k2 \cdot I_E (d\omega_1/dt) \tag{41}$$

Also, the equation (29) can be expressed by the following equation (42) in the similar way.

$$k_D\theta_D = k3 \cdot I_E (d\omega_o/dt) \tag{42}$$

Accordingly, instead of the electronic circuit 70 shown by FIG. 12, the torsion torque can be calculated by using an electronic circuit 80 shown by a block diagram of FIG. 13.

The electronic circuit 80 comprises an in-braking input rotation angular velocity detecting means 80a, an in-braking input rotation angular acceleration calculating means 80b and a torsion torque calculating means 80d. The necessary sensors in this case are the automatic transmission input rotation sensor 55, the right drive wheel sensor 25 and the left drive wheel sensor 26.

The electronic circuit 80 detects the input rotation angular velocity $\omega_1$ of the automatic transmission 50 (FIG. 7) in braking by the in-braking input rotation angular velocity detecting means 80a based on the inputs from the above various sensors. Next, the input rotation angular acceleration $(d\omega_1/dt)$ of the automatic transmission in braking is calculated by the in-braking input rotation angular acceleration calculating means 80b, and the torsion torque $k_D\theta_D$ can be calculated by the above equation (41) through the torsion torque calculating means 80d.

Further, instead of the electron circuit 80 shown by FIG. 13, it is possible to calculate the torsion torque in accordance with the above equation (41) based on a detection result of the input rotation angular velocity detecting means 60a and the input rotation angular acceleration calculating means 60b in braking and through the torsion torque calculating means 60d.

Further, in case wherein the detection result of the automatic transmission output rotation sensor 56 is employed, the torsion torque can similarly be calculated by the equation (42).

EXAMPLE 5

In the above respective Examples, the engine output torque $T_E$ is calculated by the throttle opening $\theta$ and the engine rotation angular velocity $\omega_E$. However, the engine output torque $T_E$ may be calculated by memorizing data of an engine output torque characteristic diagram of FIG. 14 in the ROM 42, and from the engine rotation angular velocity $\omega_E$ with a parameter of an intake pressure measured by the intake pipe sensor 10 (FIG. 1).

EXAMPLE 6

Figure 15:
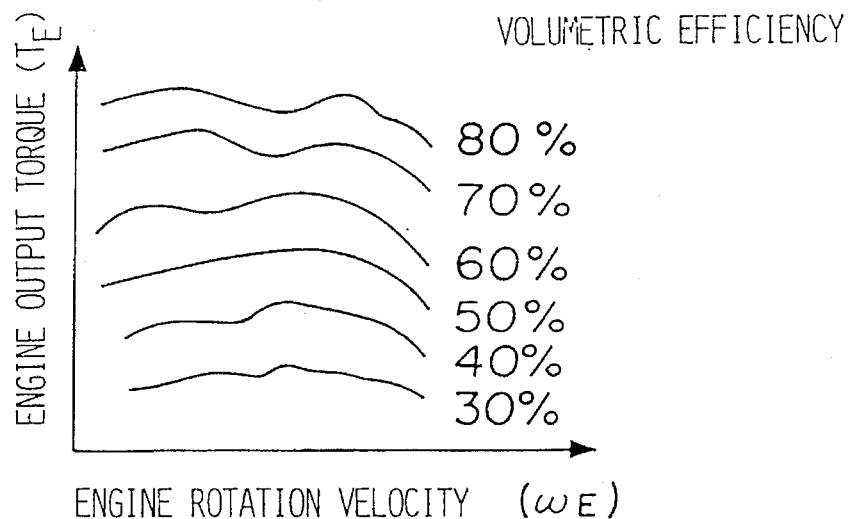
FIG. 15 is a characteristic diagram of an engine output showing a relationship between an engine rotation velocity and an engine output torque with a parameter of a volumetric efficiency.

Further, the engine output torque $T_E$ in correspondence with the engine rotation angular velocity $\omega_E$ with a parameter of a volumetric efficiency of the engine may be calculated by memorizing data of an engine output torque characteristic diagram shown by FIG. 15 in the ROM 42, and by calculating the volumetric efficiency of the engine from an output of the air flow sensor 3 (FIG. 1) and the engine rotation number N. Further, the engine output torque characteristic diagram may be memorized by approximate equations instead of memorizing it as a map.

EXAMPLE 7

In the above respective Examples, a construction has been shown for an FR vehicle. However, also in case of an FF vehicle (front engine front drive vehicle), the torsion torques of the wheel drive shafts can be detected similarly wherein only the main drive shaft (notation 23 in FIG. 1) is not present.

EXAMPLE 8

Further, in the above Examples, the explanation has been be given to a rear two wheel drive vehicle. However, also in case of a four wheel drive vehicle, when differential mechanisms are constructed at from the engine up to the four wheels, the torsion torques of the wheel drive shafts can similarly be detected as in the two wheel drive vehicle. In this case, with respect to the output torque of the engine, a front and rear wheel distribution ratio and distribution coefficients in the respective differential mechanisms of the front and rear wheels are provided similarly as in Example 1 or Example 2.

That is, the output torque of the engine (or propeller shaft) is distributed to the front wheels and rear wheels by a central differential device. Defining this distribution ratio as $k_{CD}$, the equation (3) is modified as follows.

$$I_D(d\omega_D/dt) = k_D\theta_D - k_{CD} \cdot k_{TD} \cdot k_P\theta_P \tag{81}$$

Accordingly, $$k_D\theta_D = I_D(d\omega_D/dt) + k_{CD} \cdot k_{TD} \cdot k_P\theta_P \tag{82}$$

From equation (7), $$k_D\theta_D = I_D(d\omega_D/dt) + k_{CD} \cdot k_{TD} \cdot k_T\{I_E(d\omega_E/dt) - T_E\} \tag{83}$$

Defining k4 as follows, $$k4 = k_{CD} \cdot k_{TD} \cdot k_T \tag{84}$$

The following equation is established.

$$k_D\theta_D = I_D(d\omega_D/dt) + k4\{I_E(d\omega_E/dt) - T_E\} \tag{85}$$

Therefore, the torsion torque can be calculated similarly wherein only the coefficients are different from those in case of the two wheel drive vehicle.

EXAMPLE 9

Further, in the above Examples, cases have been shown wherein the internal combustion engine is a gasoline engine. However, also in the case of a diesel engine, the torsion torque can similarly be detected by detecting the engine revolution number by a rotation sensor of a fuel pump or the like.

EXAMPLE 10

Figure 16:
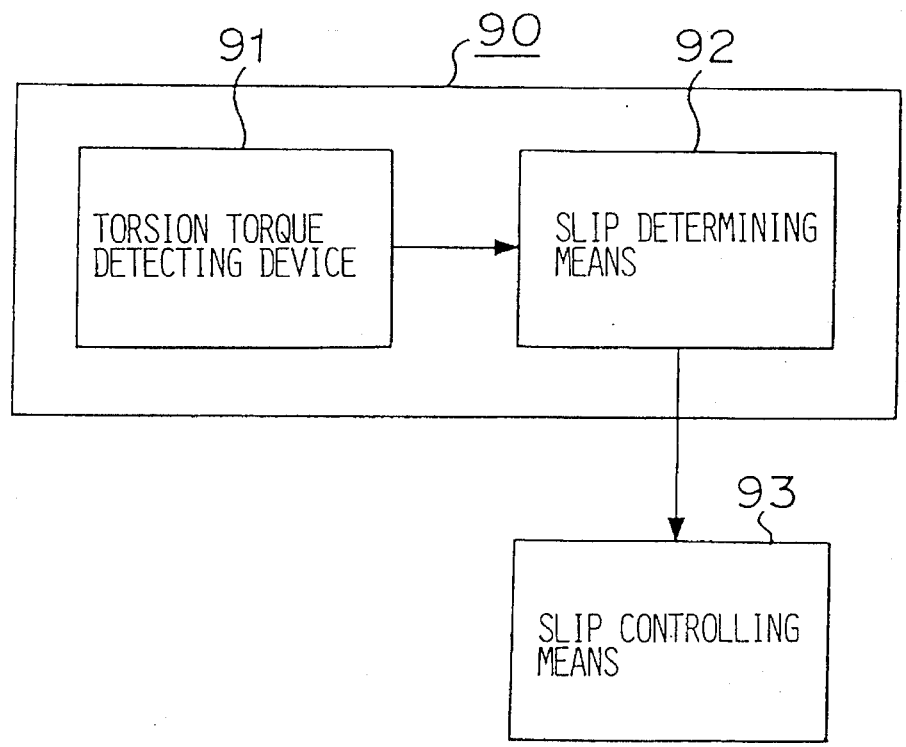
FIG. 16 is a block diagram showing the construction of other example of this invention.

When slip of wheel is caused, the direction of the torsion torque $T_D\theta_D$ which is detected in the respective Examples 3 and 4 (sign of equations (31), (41) and (42)), is reversed. Therefore, a slip detecting device can be provided which detects the generation of slip by $k_D\theta_D$. FIG. 16 is a block diagram showing the construction of a slip detecting device 90, which is provided with a torsion torque detecting device 91 in this invention that has been explained in the above Examples 1 through 9, and a slip determining means 92. The braking force is controlled by a slip controlling means 93 based on the detection result of the slip detecting device 90.

Figure 17:
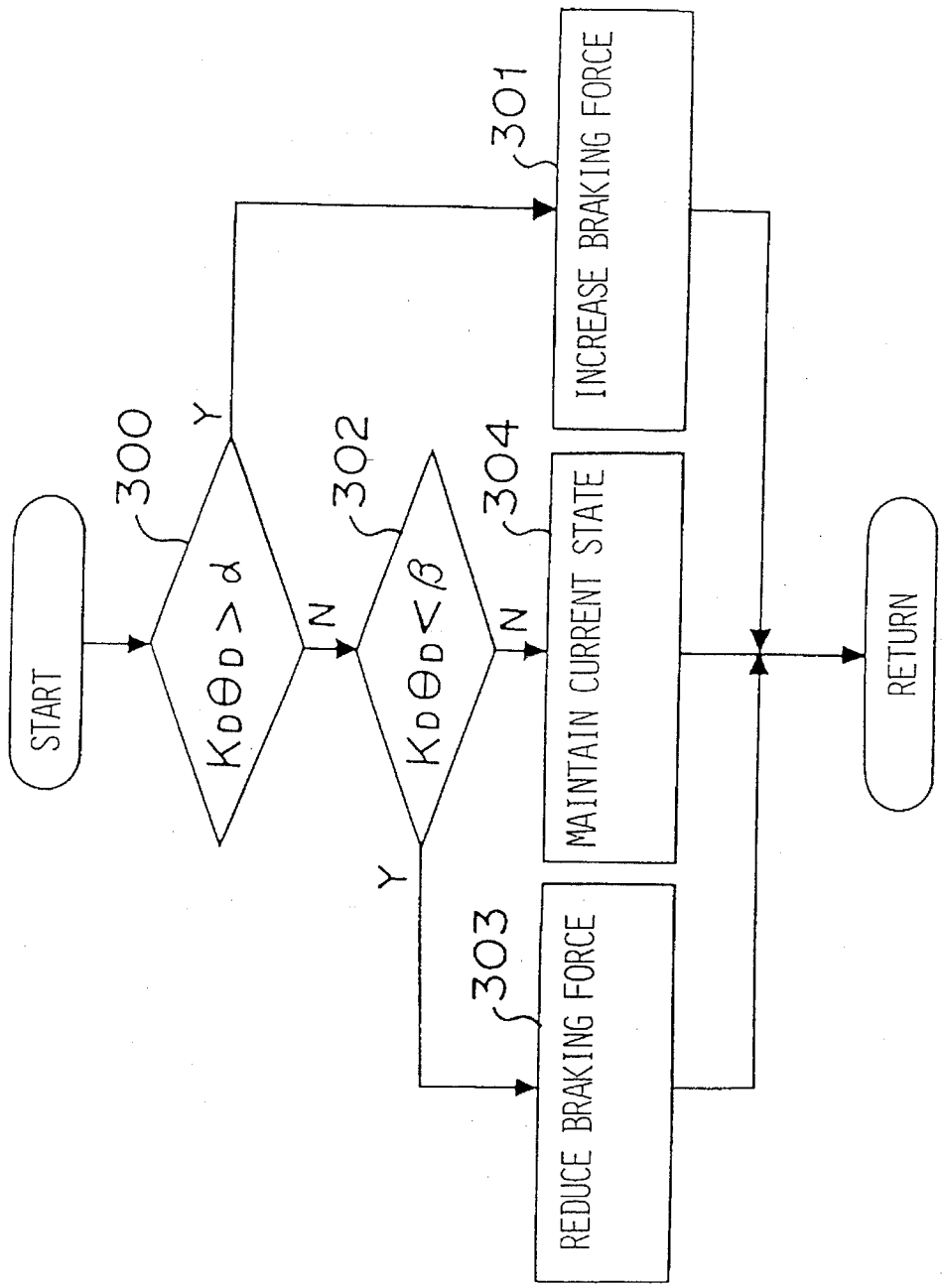
FIG. 17 is a flow chart showing the operation of the example of FIG. 16 in braking.
Figure 18:
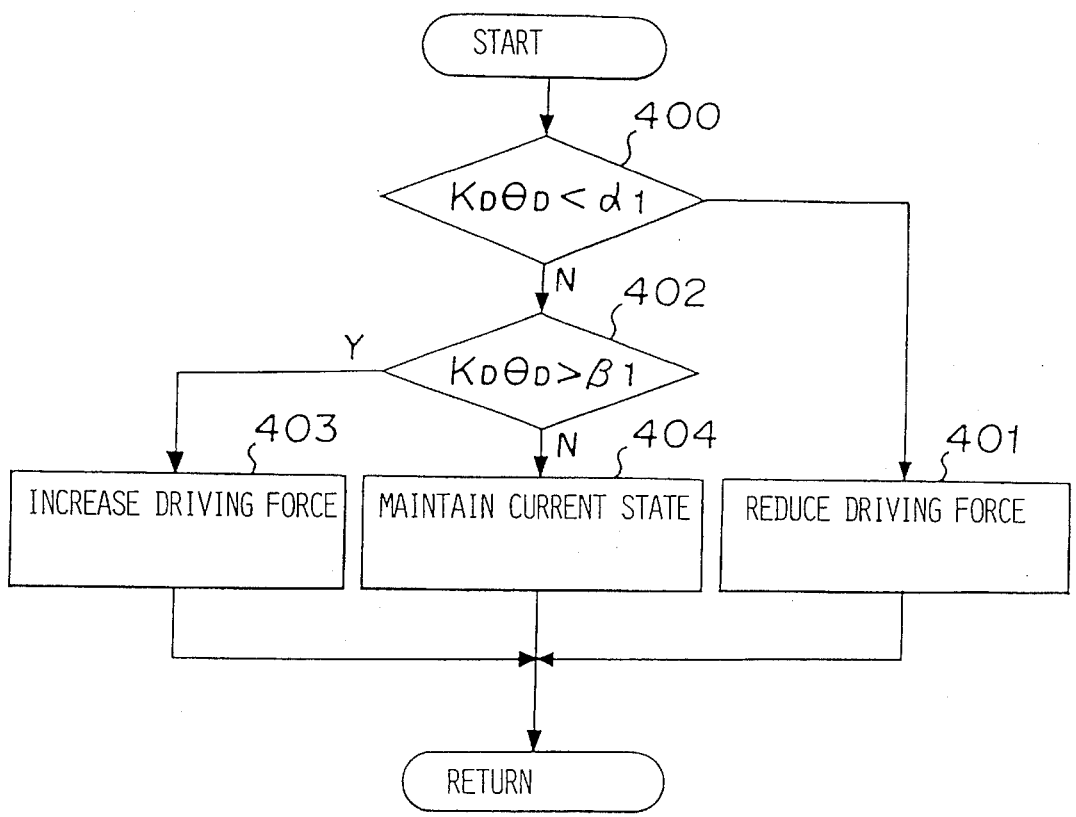
FIG. 18 is a flow chart showing the operation of the example of the FIG. 16 in forced advancing.

FIG. 17 and FIG. 18 are flow charts showing the operation of the slip detecting device 90 and the slip controlling means 93 in braking and in forced advancing.

First, an explanation will be given of the operation in braking in reference to FIG. 17. The wheel velocity becomes smaller than the body velocity by the generation of slip in braking. In braking, a driving force is transmitted from the driving wheels 29 and 30 to the drive shafts 20 and 21 which drive to rotate the engine 1, and therefore, a positive torque ($k_D\theta_D>0$) is generated in the drive shafts 20 and 21. However, when the drive wheels 29 and 30 are braked, the driving force is weakened and $k_D\theta_D$ is reduced.

Accordingly, in step 300 of FIG. 17, when the slip determining means 92 determines the torsion torque $k_D\theta_D$ detected by the torsion torque detecting device 91 is larger than a positive set value α, the operation proceeds to step 301, wherein the slip controlling means 93 increases the braking force.

When $k_D\theta_D$ is determined as equal to or less than the set value α in step 300, the operation proceeds to 302 wherein $k_D\theta_D$ is compared with a negative set value β. When $k_D\theta_D$ is smaller than β, the operation determines that the braking force is excessive, and proceeds to step 303 wherein the operation reduces the braking force. When $k_D\theta_D$ is larger than β, the operation maintains the current state in step 304.

Next, an explanation will be given of the operation in forced advancing in reference to FIG. 18. By the generation of slip in forced advancing, the wheel velocity becomes larger than the body velocity. In forced advancing, a driving forces is transmitted from the engine 1 to the driving wheels 29 and 30 via the wheel drive shafts 20 and 21 whereby the driving wheels are driven to rotate. Therefore, a negative torque ($k_D\theta_D<0$) is generated in the wheel drive shafts 20 and 21. When the slip determining means 92 determines that the detected torsion torque $k_D\theta_D$ is smaller than a negative set value α1 in step 400, the operation proceeds to step 401 wherein the slip controlling means 93 reduces the driving force.

That is, when the torsion torque $k_D\theta_D$ is determined to be smaller than the negative set value α1 in step 400, the operation determines that the driving force is large and proceeds to step 401 wherein the operation reduces the driving force. When it is determined to be equal to or larger than the set value α1 in step 400, the operation proceeds to step 402 wherein the operation compares $k_D\theta_D$ with a positive set value β1. When $k_D\theta_D$ is larger than β1, the operation determines the driving force is small, and proceeds to step 403 wherein the operation increases the driving force. When the $k_D\theta_D$ is smaller than β1, the operation maintains the current state in step 404.

Further, the control of the driving force is performed, for instance, by a second valve which is driven by a step motor of a throttle actuator. The slip controlling means 93 controls the step motor, controls the opening of the second valve, and controls an air amount.

In an anti-skid brake device, it is important in view of control to detect the generation of slip. Therefore, the detecting devices of the torsion torque shown in the above respective Examples are applicable to the detection and control of slip of wheel in the anti-skid brake device disclosed, for instance, in Japanese Unexamined Patent Publication No. 293655/1992.

EXAMPLE 11

A force F from the road can be calculated by the equations (4) and (5), based on the torque $k_D\theta_D$ which is detected by the torsion torque detecting devices as above, the wheel rotation angular acceleration ($d\omega_w/dt$) and the moment of inertia $I_W$ of wheel. That is, from equations (4) and (5), the following equation is established.

$$I_B \cdot (d\omega_B/dt) + I_W (d\omega_w/dt) = F \cdot r - k_D\theta_D \tag{111}$$

When the equation (111) is modified by disregarding $I_B$ since it is small, the following equation is established.

$$F \cdot r = I_W (d\omega_w/dt) + k_D\theta_D \tag{112}$$

The force F can be calculated from the above equation.

The force F from the road can be expressed as follows by defining the load applied on the wheel as w and the road friction coefficient between the road and a tire, as μ.

$$F = \mu w \tag{113}$$

Therefore, the road friction coefficient μ between the road and the tire can be calculated from F and w.

In an anti-skid brake device or in a traction system disclosed, for instance, in Japanese Unexamined Patent Publication no. 273948/1991, it is important in view of control to detect the road friction coefficient μ. It is possible to achieve a road friction coefficient detecting device for detecting the road friction coefficient μ by using the torsion torque detecting devices in accordance with the present invention.

Figure 19:
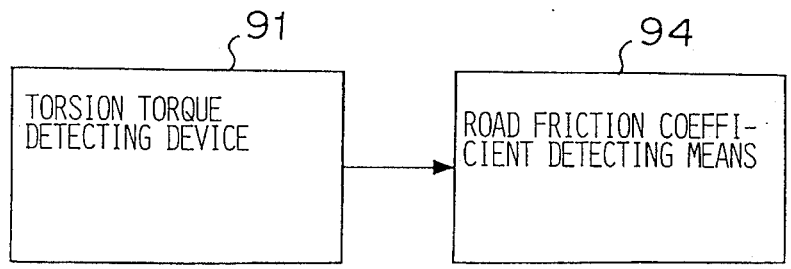
FIG. 19 is a block diagram showing the construction of other example of this invention.

FIG. 19 is a block diagram showing the construction of a road friction coefficient detecting device, wherein numeral 91 designates a torsion torque detecting device of this invention, and numeral 94 designates a road friction coefficient detecting means. The road friction friction detecting means 94 performs a calculation shown by the equations (112) and (113) based on the torsion torque $k_D\theta_D$ which is detected by the torsion torque detecting means by which the road friction coefficient is calculated.

EXAMPLE 12

Although the explanation has been given of the cases wherein the power unit for driving a vehicle is an internal combustion engine, this invention is applicable to a direct current motor or an induction motor or the like. In this case, for instance, in the case of a direct current series-wound motor, parameters for calculating the output torque are a supply voltage, a supply current, a rotation velocity and the like, whereas in case of an induction motor which is driven by a power source having a variable voltage and a variable frequency, they are a supply voltage, a power source frequency, a rotation velocity (slip) and the like.

For instance, in equation (31), the moment of inertia $I_E$ of the engine and the rotation angular acceleration ($d\omega_E/dt$) are replaced by the moment of inertia $I_M$ of a three-phase induction motor and the rotation angular acceleration ($d\omega_M/dt$).

In this case, the various data of the three-phase induction motor are detected by using a motor rotation sensor, an in-braking motor rotation angular velocity detecting means, an in-braking motor rotation angular acceleration calculating means having the same functions, instead of the engine rotation sensor 6, the in-braking engine rotation angular velocity detecting means 70a, and the in-braking engine rotation angular acceleration calculating means 70b in FIG. 12.

In this way, the output torque of the motor can easily be known by the parameters without directly measuring the output torque, and the torsion torque can be calculated by a method similar to those stated in the above Examples.

What is claimed is:

1. A torsion torque detecting device, comprising:
  a) power unit rotation velocity detecting means for detecting a rotational velocity of a power unit for driving a vehicle;
  b) power unit rotational acceleration calculating means for calculating a rotational acceleration of the power unit from the detected rotational velocity of the power unit;
  c) power unit output torque calculating means for calculating an output torque of the power unit from operational parameters of the power unit; and
  d) torsion torque calculating means for calculating torsion torques of wheel drive shafts for driving wheels from the rotational acceleration of the power unit and the output torque of the power unit.

2. A torsion torque detecting device, comprising:
  a) internal combustion engine rotational velocity detecting means for detecting a rotational velocity of an internal combustion engine for driving a vehicle;
  b) internal combustion engine rotational acceleration calculating means for calculating a rotational acceleration of the internal combustion engine from the detected rotational velocity of the internal combustion engine;
  c) internal combustion engine output torque calculating means for calculating an output torque of the internal combustion engine from operational parameters of the internal combustion engine; and
  d) torsion torque calculating means for calculating torsion torques of wheel drive shafts for driving wheels from the rotational acceleration of the internal combustion engine and the output torque of the internal combustion engine.

3. A torsion torque detecting device, comprising:
  a) internal combustion engine rotational velocity detecting means for detecting a rotational velocity of an internal combustion engine for driving a vehicle;
  b) transmission rotational velocity detecting means for detecting a rotational velocity of a transmission;
  c) transmission rotational acceleration calculating means for calculating a rotational acceleration of the transmission from the detected rotational velocity of the transmission;
  d) transmission torque calculating means for calculating a transmission torque of the transmission from an output torque of the internal combustion engine calculated from operational parameters of the internal combustion engine and a torque ratio calculated from the rotational velocity of the internal combustion engine and the rotational velocity of the transmission; and
  e) torsion torque calculating means for calculating torsion torques of wheel drive shafts from the rotational acceleration of the transmission and the transmission torque.

4. A torsion torque detecting device, comprising:
  a) in-braking power unit rotational velocity detecting means for detecting a rotational velocity of a power unit for driving a vehicle in braking wheels;
  b) in-braking power unit rotational acceleration calculating means for calculating a rotational acceleration of the power unit in braking from the detected rotational velocity of the power unit in braking; and
  c) torsion torque calculating means for calculating torsion torques of wheel drive shafts for driving wheels from the rotational acceleration of the power unit in braking.

5. A torsion torque detecting device, comprising:
  a) in-braking transmission rotational detecting means for detecting a rotational velocity of a transmission in braking wheels;
  b) in-braking transmission rotational acceleration calculating means for calculating a rotational acceleration of the transmission in braking from the detected rotational velocity of the transmission in braking; and
  c) torsion torque calculating means for calculating torsion torques of wheel drive shafts for driving wheels from the rotational acceleration of the transmission in braking.

6. The torsion torque detecting device according to claim 2 or claim 3, wherein the operational parameters are the rotational velocity of the internal combustion engine and a throttle opening of the internal combustion engine.

7. The torsion torque detecting device according to claim 2 or claim 3, wherein the operational parameters are the rotational velocity of the internal combustion engine and an intake pressure of the internal combustion engine.

8. The torsion torque detecting device according to claim 2 or claim 3, wherein the operational parameters are the rotational velocity of the internal combustion engine and a volumetric efficiency of the internal combustion engine.

9. The torsion torque detecting device according to claim 1, wherein the power unit is an induction motor driven by a power source having a variable voltage and a variable frequency.

10. A slip detecting device, comprising:
  a) a torsion torque detecting device according to claim 1, and
  b) means for detecting a slip of a wheel from a value of the torsion torque calculated by the torsion torque detecting device.

11. A road friction coefficient detecting device, comprising:
  a) a torsion torque detecting device according to claim 1, and
  b) means for calculating a friction coefficient between a wheel and a road from the torsion torque calculated by the torsion torque detecting device.

12. A torsion torque detecting method, comprising the steps of:
  a) detecting a rotational velocity of a power unit for driving a vehicle;
  b) calculating a rotational acceleration of the power unit from the detected rotational velocity thereof;
  c) calculating an output torque of the power unit from operational parameters of the power unit; and
  d) calculating torsion torques of wheel drive shafts for driving wheels from the rotational acceleration of the power unit and the output torque of the power unit.

13. A torsion torque detecting method, comprising the steps of:
   a) detecting a rotational velocity of an internal combustion engine for driving a vehicle;
   b) calculating a rotational acceleration of the internal combustion engine from the detected rotational velocity thereof;
   c) calculating an output torque of the internal combustion engine from operational parameters of the internal combustion engine; and
   d) calculating torsion torques of wheel drive shafts for driving wheels from the rotational acceleration of the internal combustion engine and the output torque of the internal combustion engine.

14. A torsion torque detecting method, comprising the steps of:
   a) detecting a rotational velocity of an internal combustion engine for driving a vehicle;
   b) detecting a rotational velocity of a transmission of the internal combustion engine;
   c) calculating a rotational acceleration of the transmission from the detected rotational velocities of the engine and the transmission;
   d) calculating a torque ratio from the rotational velocity of the internal combustion engine and the rotational velocity of the transmission;
   e) calculating a transmission torque of the transmission from an output torque of the internal combustion engine calculated from operational parameters of the internal combustion engine and the torque ratio; and
   f) calculating torsion torques of wheel drive shafts for driving wheels from the rotational acceleration of the transmission and the transmission torque.

* * * * *